June 6, 1961  A. H. FAULKNER  2,987,577
TIME DIVISION MULTIPLEX SYSTEM
Filed Oct. 2, 1958  9 Sheets-Sheet 1
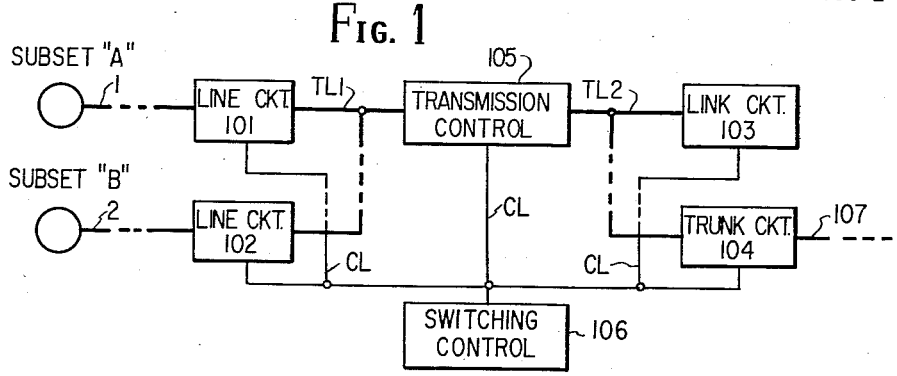
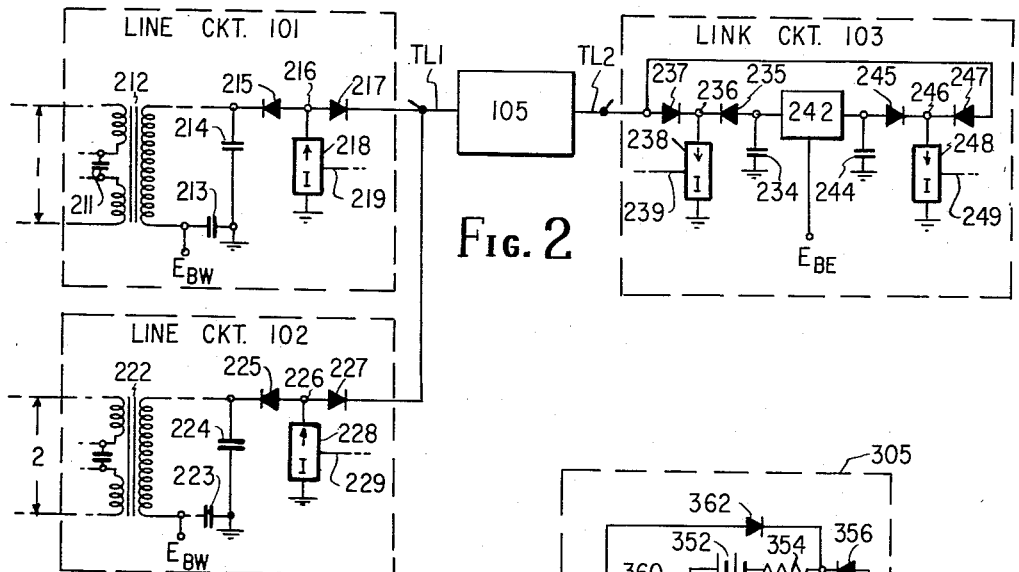
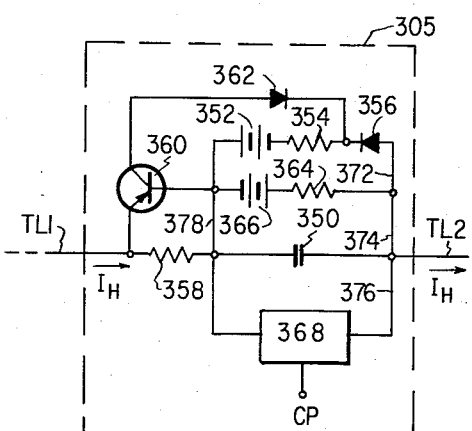
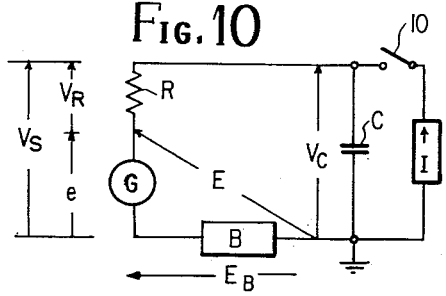
INVENTOR.
ALFRED H. FAULKNER
BY
ATTY.

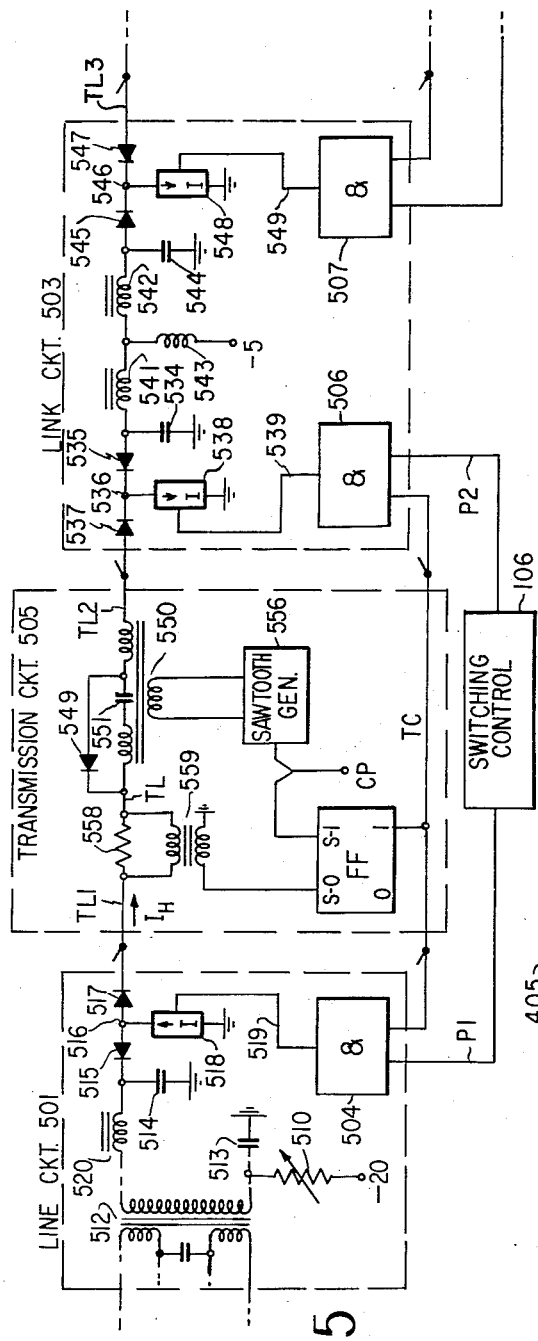
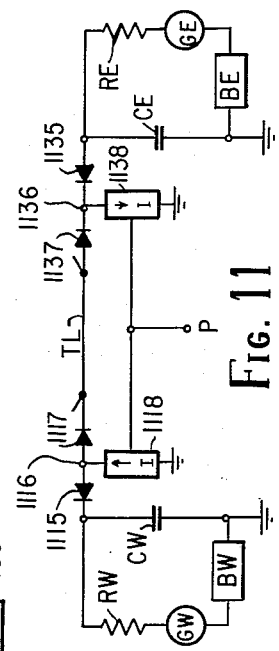
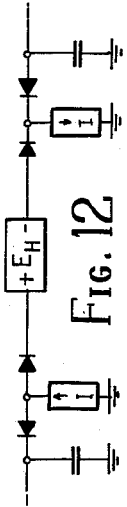
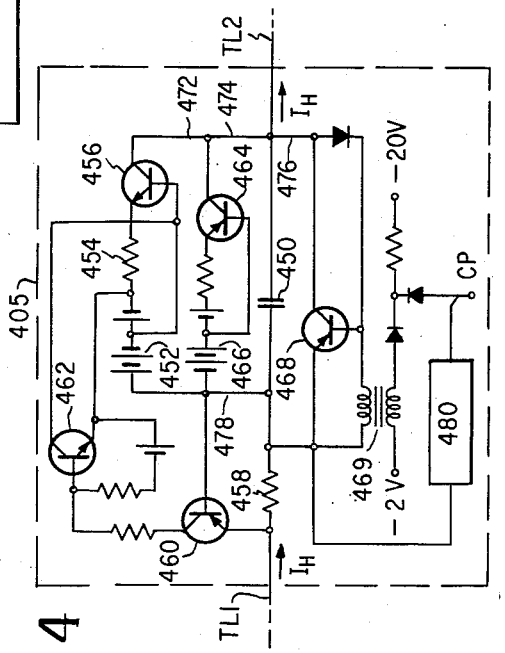

INVENTOR.
ALFRED H. FAULKNER

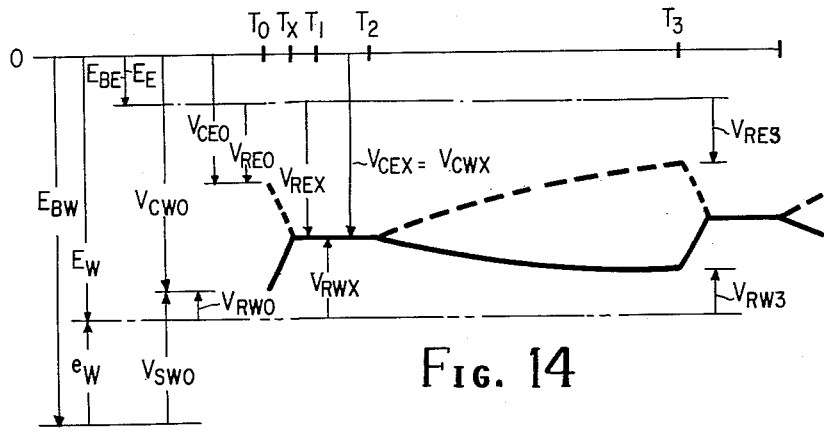
FIG. 14
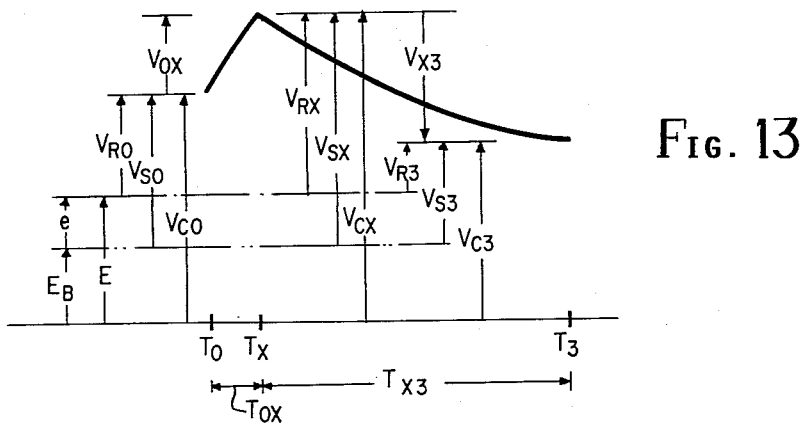
FIG. 13
FIG. 16
FIG. 15
FIG. 17
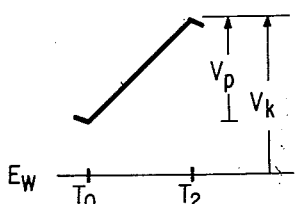
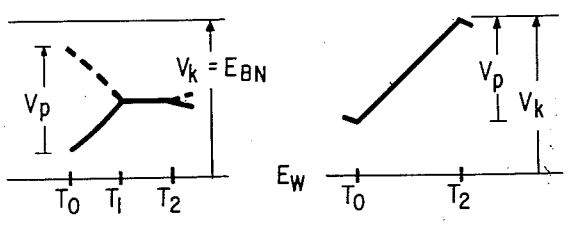
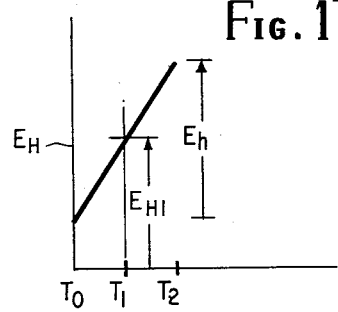
INVENTOR.
ALFRED H FAULKNER

INVENTOR.
ALFRED H. FAULKNER

United States Patent Office 2,987,577
Patented June 6, 1961

2,987,577
TIME DIVISION MULTIPLEX SYSTEM
Alfred H. Faulkner, Redondo Beach, Calif., assignor to Automatic Electric Laboratories, Inc., a corporation of Delaware
Filed Oct. 2, 1958, Ser. No. 764,979
20 Claims. (Cl. 179—15)

This invention relates to a time division multiplex system, and more particularly to the voice transmission on a time division basis in an electronic telephone switching system.

Basically, the invention is disclosed herein as embodied in a one-hundred-line electronic telephone system, wherein time division multiplexing is employed for selectively connecting line and link circuits for voice transmission over a common transmission medium, such as a common conductor referred to as a highway.

Because of the inherent difficulty of two-way transmission over the same common highway, multiplex-type telephone systems conventionally employ one highway for the transmission of signals, such as speech signals, in one direction and a separate highway for the transmission in the opposite direction. Proposals for two-way transmission over the same highway have been made, but these transmission arrangements were relatively complex. With these problems in mind, I have developed a simple and effective system for two-way communication over the same highway. Reference is made in this connection to my copending U.S. applications Serial No. 530,085, filed August 23, 1955, now Patent No. 2,931,863, for an Automatic Electronic Telephone System; and Serial No. 707,298 filed January 6, 1958, for an Electronic Switching System. The two-way transmission system is also disclosed in my U.S. Patent No. 2,854,516, issued September 30, 1958. While the system as disclosed in these formerly filed applications is quite effective, there is, inherently, a substantial loss in signal level involved in the multiplex transmission.

It is the principal object of this invention to provide an arrangement for a two-way transmission time division multiplex system, whereby the transmission loss may be eliminated, or a net gain achieved.

Another object of the invention is to provide an improved arrangement for controlling transmission in a two-way time division multiplex system.

One feature of the invention relates to an arrangement for inserting a varying control voltage in the common transmission medium to increase the modulation, thereby increasing the level of the output signal with respect to the input signal.

Another feature relates to an arrangement, which operates responsive to the commencement of current flow over the common transmission medium, for terminating the enabling pulses for the remainder of a pulse interval. With this arrangement only a short pulse of current flows over the common medium during each pulse interval. In one embodiment of this feature a common flip-flop has an output which, by way of a transmission control lead is connected in multiple to individual "and" gates associated with the several multiplex terminals. Each "and" gate also has an input lead for supplying a distributor pulse in a time slot then assigned to that terminal. Initially, during a pulse interval, if a distributor pulse is applied to the input of the "and" gate, output is obtained to control the supply of an enabling pulse at the terminal. When current commences to flow over the common transmission medium, the flip-flop is triggered to block the output of all "and" gates and thereby terminate the enabling pulses.

The combination of an arrangement for supplying a varying control voltage in the transmission medium with an arrangement for terminating the enabling pulses responsive to current flow over the transmission medium is also a feature of this invention.

The above-mentioned and the other objects and features of this invention and the manner of attaining them will become more apparent, and the invention itself will be best understood, by reference to the following description of embodiments of the invention taken in conjunction with the accompanying drawings comprising FIGS. 1 to 19 wherein:

FIG. 1 is a single-line block diagram of a telephone switching system incorporating the invention;

FIG. 2 is a schematic diagram showing the principle elements of the transmission system;

FIGS. 3 and 4 are schematic diagrams of embodiments of the transmission control portion of FIGS. 1 and 2;

FIG. 5 is a schematic and block diagram of an embodiment of the system of FIG. 1;

Figure 6:
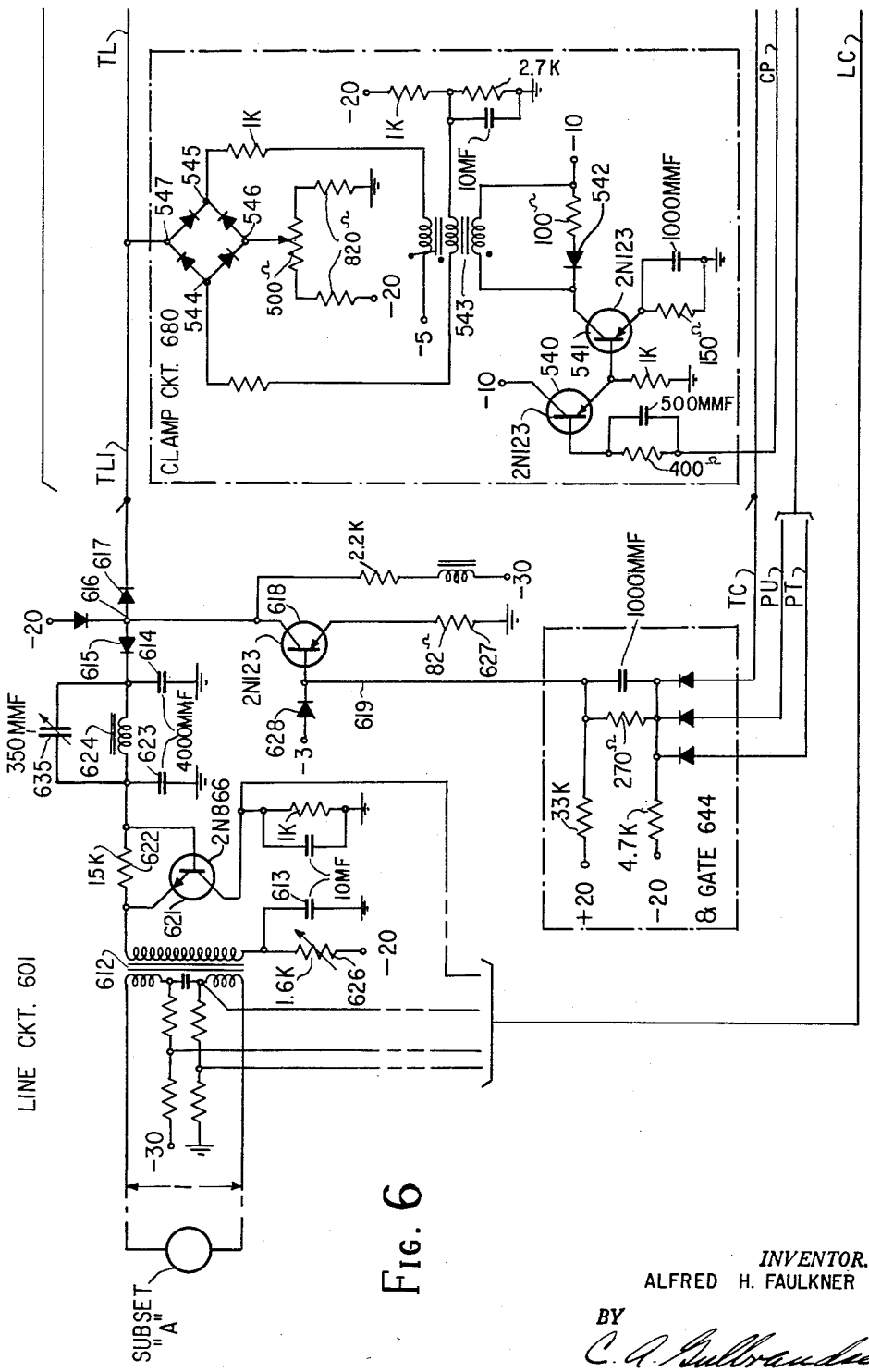
Figure 7:
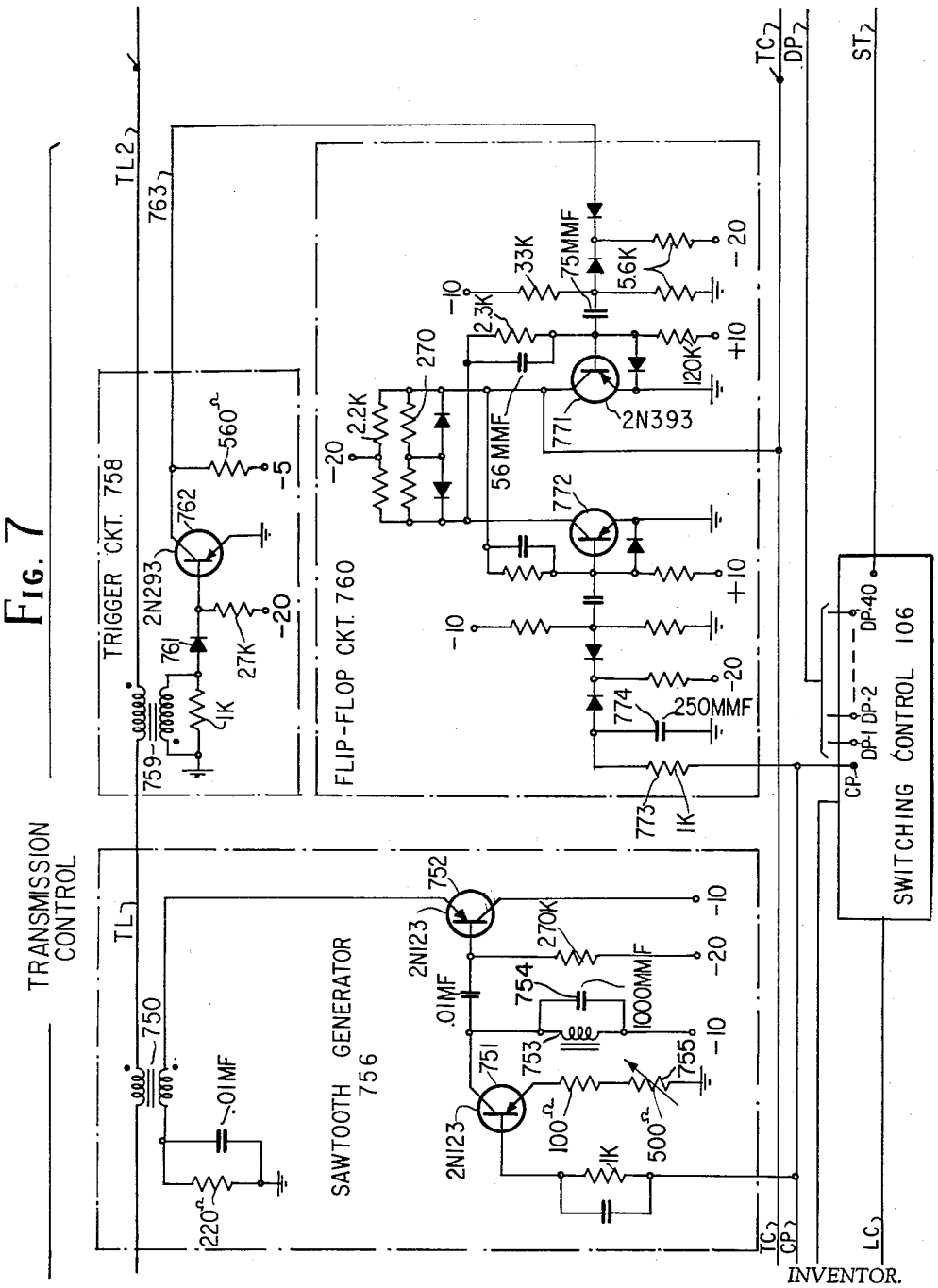
Figure 8:
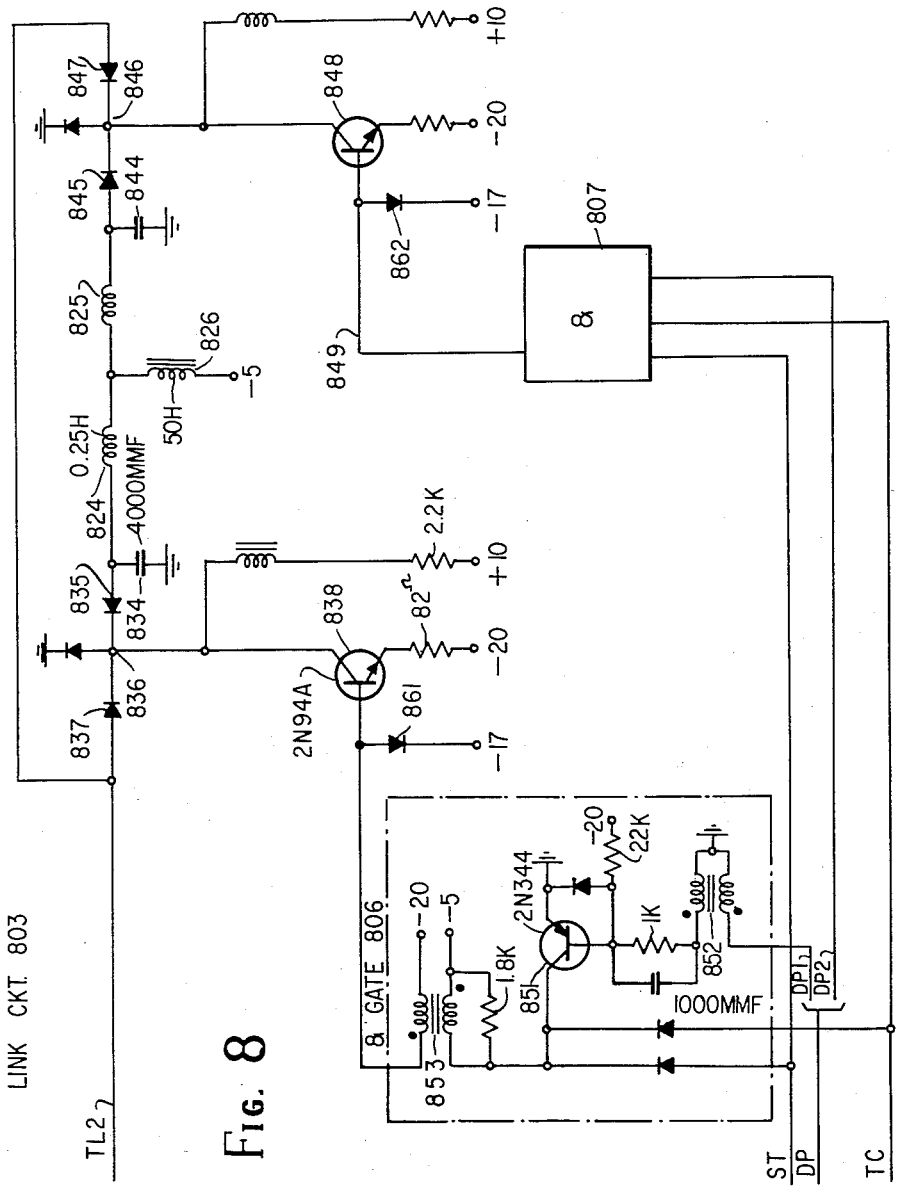
Figure 9:
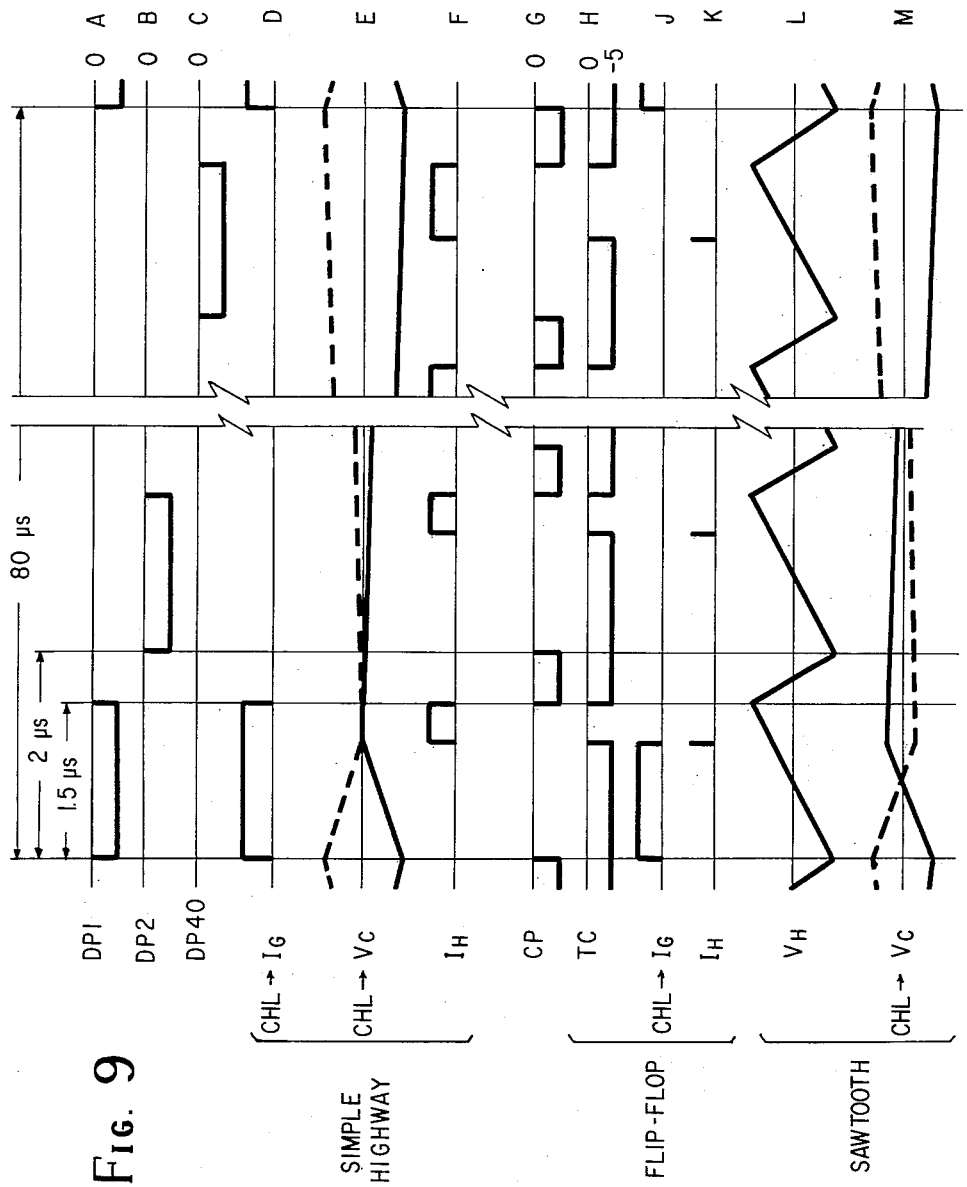

FIGS. 6, 7, and 8 when placed together from left to right are a schematic diagram of an embodiment of the system of FIG. 1;

FIG. 9 shows graphs of waveforms during one pulse frame, with different modifications of the system;

FIGS. 10, 11, and 12 are schematic diagrams useful in explaining the operation of the system; and FIGS. 13 to 19 inclusive are graphs for explaining the operation of the system.

Referring to FIG. 1, a single line block diagram of the entire system is shown, except that only two line circuits, one finder-connector link, and one trunk circuit have been illustrated. The embodiments of the invention as disclosed herein are applied to a system designed for 100 lines, although they could be applied to a system with a greater number of lines within the scope of the invention.

The two line circuits 101 and 102 are associated with subsets A and B and connected thereto by lines 1 and 2. Interconnections are made on a time division multiplex basis, over a common transmission medium comprising a single conductor, or highway, which extends through the transmission control circuit 105, with one end TL1 connected in multiple to all of the line circuits, and the other end TL2 connected in multiple to all of the link circuits and trunk circuits. Any two lines may be interconnected through the link circuit 103, using one time channel to connect the calling line to the link circuit and another time channel to connect the link circuit back to the called line. For connections to another exchange one of the lines is connected to trunk circuit 104 using a single time channel, and the output is transmitted at voice frequency over a trunk line 107 to the other exchange. There may, of course, be several other link circuits and trunk circuits not shown. It is also possible to provide link circuits interconnecting two different common highways, one for connection to the called line and the other for connection to the calling line, in which case the calling and called lines could be in the same or different groups of lines.

The switching control equipment 106 includes equipment (not shown) as follows: a pulse generator referred to as a clock, a pulse distributor, ringing and tone generators, an allotter, and other common switching control equipment. The line, link, and trunk circuits also include some switching control equipment. Various conductors are provided for handling the control signals and pulses between the different units, all of these groups being designated as control lines CL.

Examples of different types of switching control equipment and the operation thereof are disclosed in my aforesaid prior applications. However, a brief summary of the operation of the aspects of the switching control functions common to these various prior systems will be given with reference to FIG. 1. When a call is initiated on any line, its line circuit becomes associated with one of the link circuits. Coincident pulses in the time slot of one of the time channels are then supplied from the pulse distributor in unit 106 to the line circuit and the link circuit. The subscriber at the subset then receives dial tone and proceeds to dial the number of the line being called. These pulses may be transmitted to a digit register, either over transmission conductors TL1, TL2, or over control conductors CL. If the line being called is idle, pulses are then sent from the pulse distributor to the called line circuit and the link circuit in the time slot of another channel to establish a multiplex connection. After the called line is signaled and the call is answered, voice signals are then sent from the calling subset to his line circuit, thence over the multiplex connection in the first time channel to the link circuit, thence over the second time channel to the line circuit of the called line, and finally to the called subset. Voice signals are transmitted from the called to the calling line over the same path. The time channels may be permanently assigned to the link or trunk circuits; or, alternatively, if the number of lines is small, the time channels may be individual to the line.

The principal transmission elements of the line circuits 101 and 102 and the link circuit 103 are shown in FIG. 2. In the line circuit 101 and transformer 212 and other elements (not shown) couple the line 1 to a storage condenser 214. The line side of transformer 212 is separated into two sections coupled by condenser 211, to provide points for inserting transmission current and obtaining control signals. A bias voltage $E_{BW}$ is applied through the winding of transformer 212 to condenser 214, and this bias is bypassed by a condenser 213. The storage condenser 214 is coupled to the common transmission conductor TL1 through a gate comprising two diodes 215 and 217 connected in series back to back with their junction point 216 connected to a constant current source 218. Line circuit 102 is similar. In the link circuit two storage condensers 234 and 244 are associated respectively with the line finder and connector portions of the link circuit. Condenser 234 is coupled to the common line TL2 by a gate comprising diodes 235 and 237 having their common junction point 236 connected to a constant current source 238; and condenser 244 is coupled to line TL2 by diodes 245 and 247 having their junction 246 connected to a constant current source 248. The two storage condensers 234 and 244 are coupled by an audio coupling network 242. A bias voltage $E_{BE}$ is supplied through network 242 to condensers 234 and 244. Each of the constant current sources 218, 238 and 248 has an input control lead 219, 239, and 249 respectively to which the pulses are applied to cause the current to be supplied to the respective gates according to the connection which has been established.

To describe the multiplex transmission it will first be assumed that the common highway is a simple conductor TL having ends TL1 and TL2 with no control circuits coupled thereto except the multiples to the line circuits and to the link or trunk circuits, as disclosed in the first of my said prior filed applications, Serial No. 530,085, now Patent No. 2,931,863.

Assume that a connection has been established from line circuit 101 through link circuit 103 to line circuit 102, pulses in the time slot of one channel being applied to control leads 219 and 239, and pulses in the time slot of another channel being supplied to control leads 229 and 249. The calling party and the called party are then in a condition permitting a bidirectional exchange of information.

The calling party at subset A will transmit and receive intelligence to and from the transmission section of the link circuit in its particular assigned time slot and the called party at subset B will do likewise in its particular assigned time slot. The intelligence transmitted by the calling party must be stored in the transmission section of the link circuit until the called party's time slot occurs and vice versa.

Referring particularly to the transmission of intelligence between the calling party's line circuit and the link, a transmission gate in the calling party's line circuit and one in the link circuit are pulsed open simultaneously during the calling party's time slot. The intelligence transmitted to the links during the calling party's time slot is stored until transmission gates in the called party's line circuit and in the link circuit are simultaneously opened during the called party's time slot, thus enabling the intelligence stored in the link to be sent to the called party and this is repeated at the pulse repetition rate. The operation of the transmission circuit in the opposite direction of transmission is similar. The transfer of intelligence appears between capacitors 214 and 234 during the calling party's time slot and between capacitors 244 and 224 during the called party's time slot. By this transfer or sampling process, which occurs at the pulse repetition rate, the voice frequency signal originating at the calling party's substation is reproduced at the far end.

Before the transmission of signals over the transmission system is described, the functioning of the system under a no-signal condition will first be explained.

First, let us assume a few specific values for convenience. Each pulse frame may have an interval of 80 microseconds divided into 40 time slots of two microseconds each. During each time slot the distributor supplies a pulse having a 1.5 microsecond interval for the corresponding channel. There will then be a 0.5 microsecond guard interval between the distributor pulses of adjacent time channels. The value of the bias voltage $E_{BW}$ in each of the line circuits may be —15 volts, and $E_{BE}$ in each link circuit may be —5 volts.

During the time channel now assigned to the calling line, distributor pulses are applied to the leads 219 and 239 to turn on the constant current sources 218 and 238. The constant current sources in the line circuit and in the link circuit are designed to conduct in the opposite directions, as indicated by the arrows. Current flows from current source 218 toward point 216 where it tends to divide. Initially, however, current cannot flow over the lead TL since diode 217 is reverse biased because of the voltage at this time at point 236. Therefore, current flows through diode 215 to capacitor 214 at this time. It can be seen that point 216 climbs from (initially) —15 volts toward less negative values.

Since, at the link end of the common highway, current source 238 is the only other current source turned on during this time, point 236 will also be changing in potential because current flows from point 236 into current source 238. More particularly, because of the potential at point 216, the current flowing into point 236 cannot come through diode 237 so that it must come through diode 235 at this time. Therefore, point 236 drops in potential from (initially) —5 volts toward more negative values. When points 216 and 236 reach the same potential, current will be diverted to flow from point 216 through diode 217, over the common highway, through diode 237 to point 236.

The value of the constant current supplied by the sources 218 and 238 and the value of capacitors 214 and 234 determine the rate of potential change on these capacitors prior to the time current begins to flow over the common highway. The rate of potential change is directly proportional to the constant current value and inversely proportional to the value of the capacitance.

The various circuit constants involved are preferably chosen so that under no-signal conditions current begins to flow over the common highway at the midpoint of the pulse interval during which the sources 218 and 238 are turned on. The moment at which this current flow begins will hereafter be referred to as an equilibrium point. Atter the current sources 218 and 238 are turned off at the end of the pulse interval, the potentials of condensers 214 and 234 will gradually return toward their initial values.

However, these potentials will not completely recover to the bias levels by the end of the frame. The percentage of recovery will be a constant which depends upon the RC time constant in each terminal with respect to the total frame interval, which has been assumed to be 80 microseconds. Assume that these circuit constants are such that the potential on each condenser recovers by 80% of the difference between the equilibrium potential and the bias potential. A steady state condition for corresponding points of successive frames will be reached. Under this condition, the voltage on condenser 214 rises from about —14 volts at the beginning of the pulse interval to about —10 volts, which, under the assumption made above, is reached at the midpoint of the pulse; it remains at this level for the rest of the pulse and then gradually drops back to —14 volts in the interval between pulses. On the other hand, the voltage on condenser 234 drops from about —6 volts at the beginning of the pulse interval to —10 volts which it reaches at the midpoint of the pulse. It stays at this level for the remainder of the pulse and thereafter rises gradually to its original value of —6 volts.

After the equilibrium point has been reached, current flows from source 218 over the lead TL into the source 238, and capacitors 214 and 234 are kept at their respective equilibrium potentials during the remainder of the pulse interval. At the end of the pulse interval, that is, when current sources 218 and 238 are turned off, the potential on capacitors 214 and 234 begins to change in the opposite direction at a rate dependent upon the time constant of their respective paths. These paths extend, in the case of condenser 214, from the free terminal of this condenser through circuit elements (not shown) and the secondary of transformer 212 to the bias potential source $E_{BW}$, which has been assumed to be —15 volts; and in the case of condenser 234 from the free terminal of this condenser through circuit elements in coupling device 242 to the bias supply potential $E_{BE}$, which has been assumed to be —5 volts.

The time constants of the two paths just traced are substantially the same. On the other hand, from what has been said above, it follows that the time required by capacitors 214 and 234 to reach the equilibrium point is not the same as, and, as a rule, much shorter than the time required by these capacitors to return to their initial state of charge during the relatively long time interval during which the sources 218 and 238 are turned off.

For convenience, throughout the specification and claims, the change of potential on the storage condensers produced by current from the constant current sources will be referred to as the charging condition, and the change in potential during the remainder of the frame as the discharging condition.

What has been described so far is the operation of the transmission system before any intelligence is transmitted thereover, and it has been stated that under these conditions current flows over the transmission lead TL only during one half of the pulse period during which the constant current sources 218 and 238 are turned on. Let us now assume that voice signals are generated at subset A and are transmitted over line 1 and through transformer 212 to impress signal voltages upon condenser 214. The voltage across this condenser follows the signal voltage during the intervals between the multiplex pulses, influenced briefly by each of the pulses in the calling subscriber's time slot. As indicated above, the circuit constants are preferably chosen so that in the absence of a signal current flows from the current source 218 through diode 215 during the first half of the pulse interval and through diode 217 during the second half. Similarly, current flows into the current source 238 from diode 235 during the first half of the pulse interval and from diode 237 during the second half of the pulse interval.

The presence of the signal voltage (which, in the simplest case, would be a sine wave of voice frequency) on condenser 214 influences the time position in the pulse interval at which current switches from one path to the other in the following manner. As the voltage on condenser 214 swings positive, the voltage difference between condensers 214 and 234 at the start of a pulse is reduced; hence, less time is required to reach the equilibrium point. In consequence, the average current (over a pulse cycle) flowing from source 218 into condenser 214 is reduced, and, similarly, the average current flowing from condenser 234 into source 238 is reduced. The voltage across condenser 234 thus also swings positive. Similarly, as the voltage on condenser 214 swings negative, the voltage difference between condensers 214 and 234 at the start of a pulse increases; hence, more time is required to reach the equilibrium point. The average current flowing from source 218 into condenser 214 increases, causing a corresponding increase in the average current flowing from condenser 234 into source 238. The voltage across condenser 234 thus follows that across condenser 214 in the negative direction.

From the foregoing explanation, it will be appreciated that the operation of the present transmission system depends on the manner in which the current pulses of sources 218 and 238 divide at points 216 and 236 respectively; more particularly, this operation depends on the time position in the pulse interval at which capacitors 214 and 234 are, for all practical purposes, "cut off" from their associated sources 218 and 238, respectively namely, due to the constant current supplied by these sources being diverted over the common highway upon reaching of the equilibrium point. It will be noted that both capacitors keep swinging in response to each "sampling" pulse, in opposite directions around a voltage value which varies in accordance with the momentary voltage value of the signal, that is, is less negative than —10 volts during the positive half cycle of the signal and more negative than —10 volts during the negative half cycle.

During each of these sampling pulses, the equilibrium point is reached by the two capacitors at a relatively early moment (earlier than the midpoint of the pulse) during the positive half wave of the voice frequency signal and at a relatively late moment (later than the midpoint) of the pulse during the negative half wave of the signal.

The signal potentials are transferred from condenser 234 to condenser 244 through the coupling device 242, which includes a filter for removing the pulse frequency. During the called party's time slot the signals are then transmitted from condenser 234 through the gate comprising diodes 245 and 247 and current source 248 over line TL through the gate comprising diodes 225 and 227 and current source 228 in line circuit 102 to condenser 224. This signal is then coupled through transformer 222 and over line 2 to subset B. Note, however, that for the transmission from the link circuit to the line circuit, that the equilibrium point is reached by the two capacitors at a time position earlier than the midpoint of the pulse interval during the negative half cycle of the voice frequency signal and at a time position later than the midpoint of the pulse interval during the positive half wave of the signal. In a similar manner signals generated at subset B will be transmitted through line circuit 102, link circuit 103, and line circuit 101 to subscriber station B.

With a simple conductor as the common transmission line TL as described above, the peak voltage on the receiving condenser, which is reached at the equilibrium point, is always somewhat less than the voltage of the transmitting storage condenser at the beginning of the sampling pulse. Also, if a long frame time (low pulse repetition rate) is used to accommodate more time channels while retaining a fixed width of time slot for each channel, the transmission efficiency decreases greatly. This is because of the fact that the average value of charge on the storage capacitors drops far below the peak value. According to the invention, this limitation is overcome by providing an arrangement for increasing the peak value of the voltage on the receiving condenser with respect to the input signal supplied to the transmitting storage condenser. This is done by inserting a varying control voltage in the transmission control circuit 105 between the ends TL1 and TL2 of the common highway. If there is any voltage in series in the common highway at the time position at which equilibrium is reached, the voltages on the two storage condensers 214 and 234 will not be equal, but will differ by the value of such control voltage. By properly choosing this control voltage, the deviation of the equilibrium time position from the midpoint of the time interval for a given input signal can be increased, as will be explained in further detail with reference to the other figures.

A simple arrangement for supplying the varying control voltage is shown in FIG. 3 as a control unit 305 inserted between the two ends TL1 and TL2 of the highway; being an embodiment of the transmission control circuit 105 shown in FIGS. 1 and 2. A condenser 350 across which the voltage is developed, is inserted in series in the highway. A battery 352, resistor 354, and a diode 356 are connected in series across condenser 350 to supply charging current. This current flowing from battery 352, over conductor 378, to condenser 350; and from the condenser over conductors 374 and 372, diode 356, and resistor 354 back to the battery causes the condenser 350 to charge so that the voltage at the end TL1 of the highway increases with respect to end TL2. Referring to FIGS. 2 and 3 together, when the voltage in the loop measured from ground through condenser 214 over the highway TL through the unit 305 and through condenser 234 back to ground reaches a value of zero, current flows from source 218 over the highway to source 238 which, on conductors TL1 and TL2 has a value $I_H$. This current produces a voltage drop across a small resistor 358 inserted in series with the highway in unit 305. A transistor 360 has its emitter-base connection connected across this resistor, so that the voltage causes the transistor to conduct. The collector circuit of transistor 360 is connected through a diode 362 to the junction point of resistor 354 and diode 356, and its circuit is completed through resistor 354 and battery 352 to its base terminal connected to conductor 378. This current effectively blocks current flowing over conductor 372 and through diode 356, to thereby stop the charging of condenser 350. It is desired that the voltage across condenser 350 remain substantially constant for the remainder of the pulse interval during which the current $I_H$ continues to flow. This could be accomplished by making the current I–372 very large compared to the current $I_H$. An alternative arrangement is to supply a bias current which opposes the current $I_H$ to maintain the control voltage substantially constant during the portion of the pulse interval following the equilibrium time position. Such an arrangement is shown in FIG. 3 by a battery 366 which causes current to flow through resistor 364 and over conductor 374 to condenser 350. The values are chosen such that when the current I–372 is cut off the current I–374 equals the current $I_H$. At the end of the pulse interval it is necessary to discharge condenser 350 before the beginning of the pulse interval of the succeeding time channel. A 0.5 microsecond guard interval between the pulse intervals of the adjacent time channels is provided during which a restoring clock pulse is applied to terminal CP. This pulse triggers a clamping circuit 368 which discharges the condenser 350 and also applies a shunting clamping voltage from the highway TL to ground.

To obtain linear transmission, the highway control voltage should change at a linear rate. This may be accomplished by using transistors in a circuit similar to that of FIG. 3 as shown by the unit 405 in FIG. 4. The charging current is obtained from the circuit including battery 452 and transistor 456 for supplying the current which flows from the battery over lead 478 to the condenser 450, and from the condenser over leads 474 and 472 to the transistor 456. The bias current for counteracting the current $I_H$ after equilibrium is supplied from the battery 466 through transistor 464 and over lead 474 to the condenser 450, and from the condenser over lead 478 back to the battery. When highway current flows, the voltage across a small resistor 458 causes a transistor 460 to conduct. The collector current of transistor 460 is amplified by transistor 462, and applied to the base circuit of transistor 456 to cut it off and terminate the current over conductor 472.

These circuits include additional biasing batteries and resistors as shown.

The clamping current for discharging the condenser 450 during the guard interval is supplied by a transistor 468. The pulse at terminal CP is coupled to the emitter base circuit of transistor 468 through a transformer 469, with biasing terminals, diodes, and a resistor connected to the primary winding of the transformer as shown. The terminal CP is normally at a zero potential level and during the 0.5 microsecond guard interval a −5 volt pulse is applied. The pulse at the terminal CP also is used to trigger a shunt clamp circuit 480.

Referring to FIG. 5, another embodiment of the transmission control circuit 105 is shown as unit 505. A line circuit 501, a link circuit 503, and a switching control circuit 106 are also shown. The line circuit 501 is similar to the line circuit 101 shown in FIG. 2, except that an adjusting resistor 510 is included in the bias circuit, a filter inductor 520 is shown between the secondary of transformer 512 and the storage condenser 514, and an "and" gate is included in the pulse input circuit to the constant current source 518. The link circuit 503 is similar to link circuit 103, except that "and" gates 506 and 507 are shown in the pulse input leads to the constant current sources 538 and 548. The audio coupling device is shown as comprising two inductors 541 and 542 in series between the storage condensers 534 and 544, with the bias supplied at their junction through a choke 543 which has high impedance at the voice frequencies. In this figure the called-line side of the link circuit is shown as being connected to another common highway TL3, which would have its own switching and transmission control circuits to which the input leads of "and" gate 507 would be connected. Such a second highway could, of course, be used with any of the embodiments disclosed.

The basic operating principle is the same in this circuit as in those described above. At the beginning of the pulse interval of the assigned time channel, current will flow from source 518 into condenser 514 and from condenser 534 into source 538 through diodes 515 and 535 respectively, until the equilibrium potential in the loop comprising condenser 514, the transmission control circuit 505, condenser 534 and ground reaches zero. Then the current is diverted to flow from source 518 through diode 517, through transmission control circuit 505, through diode 537 into source 538. The varying control voltage is supplied from a sawtooth generator 556 coupled to the highway through a transformer 550.

In the prior circuits which use a simple conductor as the common highway, and in the circuits of FIGS. 3 and 4, the current continues to flow over the common highway after the equilibrium time position until the end of the pulse interval, although this current flow serves no useful purpose other than providing a simple arrangement for controlling the charges on the condensers in the line and link circuits. According to the invention, an arrangement is provided which responds to the highway current to terminate the current flow at the constant current sources, thereby terminating the highway current.

The switching control circuit 106 supplies pulse trains over leads P1 and P2 to line circuits 501 and link circuit 503 respectively as long as a connection remains established between them, the pulses being in the same time slot corresponding to the time channel being used for the calling-line connection. During the initial portion of each pulse interval, the signal on lead TC is in an "on" condition so that the pulses are gated through the "and" gates 504 and 506 to the leads 519 and 539 respectively. The constant current sources 518 and 538 are therefore conducting to charge the condensers 514 and 534 respectively. After the equilibrium time position is reached, the current, which is diverted over the common highway, produces a voltage drop in a sensing resistor 558 in series with the highway. This voltage is coupled through transformer 559 to the S–0 input of flip-flop 560, flopping the flip-flop to its "0" position, so that the output from its "1" terminal to lead TC is switched to an "off" condition. Therefore, the outputs of gates 504 and 506 to leads 519 and 539 respectively are terminated, thereby terminating the output of the constant current sources 518 and 538 respectively. Therefore, the current flow $I_H$ over the common highway is terminated.

This feature of terminating the highway current after a short interval instead of permitting it to flow until the end of the pulse interval as applied at leads T1 and T2, may be used with any of the embodiments of the two-way transmission system as disclosed in my said applications. However, it is particularly useful with a transmission control circuit in which a varying voltage is coupled nto the common highway through a transformer, since the voltages on the storage condensers on the line and link circuits would otherwise continue to vary along with the control voltage.

In my application, Serial No. 707,298, the equilibrium time position occurs when a predetermined difference in voltage exists between the two storage condensers. This voltage may be obtained by a Zener diode inserted in the common highway. This has no effect on transmission other than to shift the operating points so as to employ the available supply voltage to best advantage. In the transmission control circuit 505 a diode 549 and a capacitor 551 are provided to accomplish this function. A portion of the sawtooth wave form induced in the secondary of transformer 550 is used to charge condenser 551 during the 0.5 microsecond guard interval. The relative number of turns in the two secondary windings of transformer 550 can be varied to secure any desired relation between the varying and constant components of the voltage between the ends TL1 and TL2 of the highway. Thus, the average value of the sawtooth wave form can be biased to any desired operating level on the highway. Alternatively, diode 549 and condenser 551 may be omitted and a Zener diode substituted for condenser 551. The circuit constants are so adjusted that with no signal the equilibrium time position occurs in the middle of the pulse interval as supplied at the leads P1 and P2.

The sawtooth generator 556 is designed to produce an output voltage wave form which changes at a linear rate during the 1.5 microsecond pulse interval of each time slot, and which recovers during the 0.5 microsecond guard interval responsive to the pulse applied to the terminal CP. Thus, a voltage is introduced in series in the highway which varies linearly with time, and which in conjunction with the condenser voltages determines the time position at which equilibrium is reached during each frame. Thus, considering signal transmission from line circuit 501 to the link circuit 503, when a positive signal potential is applied across condenser 514, the equilibrium time position is reached during the first half of the pulse interval. The highway control voltage as measured at the end TL1 with respect to end TL2 is at this time more negative than its mid-pulse value. Therefore, equilibrium is reached at an earlier time position than it would be without the control voltage. Similarly, during a negative half cycle across condenser 514 the equilibrium is reached at a time position during the last half of the pulse interval, and at this time the highway voltage is more positive than its mid-pulse value, so that the equilibrium time position is reached later than it would be without the control voltage.

A typical telephone system in accordance with FIGS. 1 and 2, embodying the features of this invention, is disclosed in FIGS. 6, 7, and 8, with the circuit elements relating to the transmission being shown in detail. These figures should be placed together side by side from left to right. A line circuit 601 in FIG. 6 and a link circuit 803 in FIG. 8 are connected by a transmission control circuit in FIGS. 6 and 7. The transmission control circuit comprises a clamp circuit 680, a sawtooth generator 756, a trigger circuit 758 for detecting current flow on the highway, and a flip-flop circuit 760. Switching is controlled by the unit 106 as in FIG. 1.

The arrangement and operation of the embodiment of FIGS. 6, 7, and 8 is generally similar to that shown and described for FIG. 5 except as follows. No elements for obtaining a constant or direct component of the highway control voltage are included, such as provided by diode 549 and condenser 551 in FIG. 5; so that with no modulation, when equilibrium point is reached at the middle of the pulse interval the control voltage is zero. In FIG. 6 the transmission control circuit includes a clamp circuit 680, and the line circuit includes an impedance converter and a filter connected between the transformer 612 and the storage condenser 614. The link circuit called-line connection is made to conductor TL2 and controlled by equipment 106.

In line circuit 601 the impedance converter comprises a transistor 621 connected in a grounded collector or "emitter-follower" arrangement. As an example, the line circuit may have a 1000-ohm impedance as seen looking into the secondary of transformer 612, and the transmission path may have a 15,000 ohm impedance looking away from the base of transistor 621. Transistor 621 is adjusted by means of the shunt resistor 622 to have a current gain of 15; without this shunt resistor the current gain would be higher than 15. This results in a current ratio of 15 as between the emitter side of transistor 621 and the base side, which means that every milliampere of current flow in the emitter circuit will correspond to $\frac{1}{15}$ of a milliampere flow in the base circuit. This arrangement, therefore, makes it possible to reduce the current level on the transmission path TL without a drop in voltage level.

More particularly, in the transmission of intelligence from the link to the line circuit the signal impressed on condenser 614 and through the filter to the base of transistor 621 is reproduced in the emitter circuit of the device and thus impressed on transformer 612 for transmission to the subscriber line. It will thus be seen that during link-to-line transmission transistor 621 functions both as an impedance converter and a source of amplification. During line-to-link transmission the transistor, in conjunction with shunt resistor 622, presents a 1000-ohm termination to the line and extends the resulting signal through the filter to condenser 614 and thence on to the common highway. The power loss incurred in the line circuit in the direction of transmission, resulting from the change in impedance, is compensated by the power gain provided in the corresponding impedance converter of the distant subscriber's line circuit. The impedance conversion described above reduces the power level transmitted over the multiplex for a given power level on the line circuits, whereby the use of moderate currents and voltages in pulse transmission gates is made possible.

Condenser 623 and choke 624, along with the storage condenser 614, form a low pass filter for passing the voice frequency signals while blocking the multiplex pulse frequency. The inductor 624 is shunted by a variable capacitor 625 to provide for adjustment of the filter.

The constant current source, performing the function of source 218 in FIG. 2, comprises a transistor 618 connected in a common emitter configuration. The transistor is biased such that in the absence of the pulse on lead 619 to the base, the transistor is non-conducting. When a pulse appears on lead 619, the transistor is turned on to deliver constant current from its collector to point 616 of the gate. The current is made constant by clamping the base through a diode 618 to a fixed voltage point (—3), so that the collector current is determined by the value of the emitter resistor 627. Therefore, the tolerance of this resistor 627 should be small (1%).

The bias for the line circuit is provided by connecting the lower end of the secondary of transformer 612 through an adjustable resistor 626 to a —20 volt terminal. This resistor is adjusted so that with no modulation the equilibrium point is reached at the mid position of the pulse interval. It is shunted by a very large capacitance 613, so that the voltage at the lower end of the transformer winding is substantially constant with a value of about —15 volts.

A group of conductors LC from the switching control unit 106 are connected through various circuit components (not shown) to different points in the line circuit for control purposes.

The "and" gate 644 in the line circuit has three inputs on leads TC, PU, and PT which are connected through respective diodes and the other elements as shown to output on lead 619 to control the transistor 618. The input on lead TC from the output of flip-flop circuit 760 is at an "on" condition at the beginning of the pulse interval of every time slot and is switched to an "off" condition when equilibrium is reached during that time slot.

In the control system as shown in this embodiment, it is assumed that each link circuit is permanently assigned two time slots, one for the calling side and one for the called side. For example, link 803 is assigned time slot 1 for the calling side and time slot 2 for the called side. Therefore, when a call is initiated from line circuit 601 and a connection is made to link 803, the switching control unit 106 causes pulses from the distributor in time slot 1 to be applied to the units lead PU and the tens lead PT of line circuit 601 and transmitted to the "and" gate 604. Therefore, during time slot 1 at the beginning of the pulse interval all the inputs of "and" gate 604 would be in the "on" condition, and a pulse would be transmitted to the output on lead 619 to cause current to be supplied from transistor 618 to the gate point 616.

The clamp circuit 630 in the transmission control circuit is provided to reduce cross-talk. The highway is reactive, with a substantial amount of shunt capacitance, and therefore it can hold the stored information longer than the muitplex period, thereby producing cross-talk. This residual signal is removed by clamping the highway to a fixed reference voltage between the two multiplex pulse intervals. This has to be done during the guard interval, and, therefore, the 0.5 microsecond clock pulse from terminal CP is used. To minimize the load on the clock, an emitter-follower comprising a transistor 540 is used to drive a pulse amplifier comprising transistor 541. The purpose of diode 542 is to cut off the under shoot of the positive pulse that appears on the collector of transistor 541. A transformer 543 has its primary winding in the collector circuit of the transistor 541. One secondary winding supplies a positive 15-volt pulse to a point 544 and another secondary winding, a negative 15-volt pulse to point 545 of a bridge consisting of four diodes (as shown). Point 546 is biased to approximately —10 volts and point 547 is connected to the highway. Normally, the diodes are biased such that they are blocked. If the highway is initially more negative than —10 volts at the beginning of the guard interval, the two left hand diodes will conduct, and if initially more positive than —10 volts, the two right hand diodes will conduct, in either case clamping the highway to the —10 volts.

The sawtooth generator 756 is controlled by the clock pulse from terminal CP. The pulse is applied to the base of transistor 751 to turn it on during the guard interval. The inductor 753 forms a high impedance for the fast changing collector current, so capacitor 754 is charged with an almost constant current. The collector current, and therefore also the sawtooth amplitude, is controlled by variable resistor 755. The capacitor 754 is charged during the 0.5 microsecond guard interval and will discharge through inductor 753 during the following 1.5 microsecond interval. The sawtooth obtained is applied through a coupling capacitor and emitter follower comprising transistor 752 operating in class A. Transformer 750 inserts the output in series with the highway TL.

The function of trigger circuit 758 is to detect current flow over the highway TL to trigger the flip-flop circuit 760. As soon as current flows through the primary winding of transformer 759, a voltage will be induced in its secondary. A silicon diode 761 forms a threshold of about 0.6 volt to avoid triggering by an extraneous signal. The proper signal has sufficient amplitude to turn off transistor 762. The collector of transistor 762, normally close to ground, thus changes to —5 volts as soon as the highway is conducting. This signal is transmitted over conductor 763 to the flip-flop circuit 760.

In the flip-flop circuit 760 transistor 771, normally cut off, will be turned on by the trigger pulse and bring the output lead TC to ground. This lead TC is connected in multiple to all of the line and link circuit gates. Ground on this lead TC is the "off" condition and will close all of the gates. During the guard interval, the flip-flop is reset by the pulse from terminal CP. Resistor 773 and condenser 774 are used to integrate the clock pulse, and thereby modify it to a triangular shape so that it will have a longer rise time. This introduces a time delay in resetting the flip-flop to insure that multiplex pulses with excessive fall times do not turn the gates on again.

The link circuit 803 includes a storage condenser 834 coupled through diodes 835 and 837 to the highway conductor TL2 for a multiplex connection to the calling line; and a storage capacitor 844 coupled through diodes 845 and 847, also to highway conductor TL2 for a multiplex connection to the called line. The constant current sources of the two gates comprise transistors 838 and 848 respectively, corresponding to the sources 238 and 248 in FIG. 2. The base circuits of these transistors are clamped through diodes 861 and 862 respectively to a fixed potential (—17 volts) so that their emitter resistors determine the constant current, as for the line circuit transistor 618. These transistors are controlled by distributor pulses in their respective time slots delivered through the "and" gates 806 and 807 respectively. These gates are similar, so only 806 is shown in detail. Each of these "and" gates has an input from the transmission control conductor TC, from a switching control conductor ST of the unit 106, and from an individual distributor pulse lead from the distributor in unit 106. For example, the transistor 838 is assigned time slot 1 so the gate input is connected to lead DP1; and transistor 848 is assigned time slot 2 so its gate input is connected to lead DP2. In the gate the inputs to leads TC and ST are simply connected through respective diodes, but the input on the lead DP1 has a small amplitude so additional circuitry is required. Transformer 852 steps up and inverts this voltage. Transistor 851, normally conducting, is cut off by this positive pulse. This produces a negative pulse at the primary of transformer 853, if the inputs TC and ST are "on." Transformer 853 inverts this pulse and the resulting positive pulse turns on the constant current source transistor 838.

Note that the constant current source transistors 838 and 848 in the link circuit are NPN type, while the corresponding transistors 618 in the line circuits are PNP. This use of opposite conductivity transistors at the two ends of the highway is essential to the operation of the two-way transmission system.

The two storage capacitors 834 and 844 together with two series inductors 824 and 825 form a low pass filter for coupling these two capacitors at audio frequencies while blocking the multiplex pulse frequency. The junction of the two inductors is connected through a high inductance choke 836 to the −5 volt bias point.

Graphs of some ideal wave forms during one multiplex frame are shown in Fig. 9. It is assumed that the frame time interval is 80 microseconds, with 40 time channels, each having a 2-microsecond time slot. The beginning and end portions of the frame are shown with most of the intermediate portion broken out as indicated. Graphs A, B, and C illustrate the distributor pulses for channels 1, 2, and 40 respectively. These graphs may be applied to any of the embodiments of the system. Note that each distributor pulse has a 1.5 microsecond interval within its 2-microsecond time slot, leaving a 0.5-microsecond guard interval between the distributor pulses of adjacent channels.

The graphs D to M show wave forms at different points in the transmission circuit and with different arrangements. When the distributor pulses are applied to the line and link terminals to establish multiplex connections, it is assumed that one of the links is using channel 1 for a connection to the calling line and channel 2 for the connection to the called line, while channel 40 is being used by another link or trunk circuit for another conversation.

Graphs D, E, and F show some current and voltage wave forms for embodiments of the transmission system in which the common highway has no control voltage and no trigger circuit for detecting current flow.

The output current of the constant current sources associated with channel 1 is shown by graph D. Since these sources are controlled by the pulse DP1, the pulses as shown in graphs A and D coincide in time. The voltages on the storage condensers are shown in graph E for the calling line connection, the voltage on the condenser in the line circuit being shown by a solid line, and that in the link circuit by a dashed line. At the beginning of the pulse interval, the voltages are separated by an amount depending upon the signal levels at the respective condensers. As the currents from the respective sources flow into the condensers to charge them, they change in potential linearly until they reach the same value at the equilibrium point. This value then remains constant until the end of the pulse interval, and during the remainder of the frame gradually returns to the initial values as shown. At the equilibrium time position current commences flowing over the common highway and continues to flow until the end of the pulse interval as shown by graph F. Since this current is measured in a common portion of the circuit, a pulse will appear for each time channel being used. Note that the width of the pulse is a function of the modulation. Since channels 1 and 2 are used for the same conversation, the pulses have the same width. However, since channel 40 is used for a different conversation, its pulse has a different width.

It may be noted in graph F that all of the intelligence is conveyed by the leading edge of the highway current pulse in each time slot. FIGS. H and K illustrate how these pulses may be reduced to have only a short interval during each time slot, by using a trigger circuit and flip-flop, which are shown in FIGS. 5 and 7. To reset the flip-flop it is necessary to have the clock pulse CP supplied during the guard interval. This pulse train is shown in FIG. G. The output, which is delivered from the flip-flop to conductor TC, is shown by graph H. Initially, during any time slot this signal is in its "on" condition at −5 volts. The current delivered by the constant current sources associated with channel 1 is illustrated by graph J. Initially, the signals TC and DP1 are both on so that pulse is delivered from the "and" gate to the current source, causing it to conduct. The highway current is shown by graph K. When the equilibrium potential is reached, current commences to flow over the highway the same as shown in FIG. F. However, this current triggers the flip-flop so that the signal on lead TC is switched to its "off" condition at ground potential. This blocks the gate output pulses to turn off the constant current sources (graph J), and therefore no further current is delivered to the highway (graph K). Thus, the current on the highway has only a short interval, the time position of which is a function of the modulation.

Examples of voltage wave forms obtained by using a varying highway control voltage are shown by graphs L and M. Graph L shows the control voltage produced in the highway by transformer coupling to a sawtooth generator, particularly as shown in FIG. 7. Graph M shows the line circuit condenser voltage by the solid line and the link circuit condenser voltage by the dashed line for channel 1. Note that each of these wave forms considered by itself has the same shape as in graph E, but that at the equilibrium point the voltages are separated by the value of the control voltage at that time (shown in graph L). The initial separation of the two condenser voltages is reduced by this amount, meaning that a smaller signal is required for the same time modulation. The flip-flop is also used with this arrangement so that the graphs G to K also apply. The clock pulse shown in FIG. G controls the sawtooth generator to obtain the graph L. The condenser voltages begin to return to their initial values immediately after the equilibrium time instead of after the end of the pulse.

The operation of the transmission system will be further explained by reference to FIGS. 10 to 19 and the list of equations given at the end of the specification.

First consider the circuit of FIG. 10. A storage condenser C, a bias supply B, a signal generator G, and resistance R are connected in series. A constant current source I is connected across the condenser C when switch 10 is closed. Potentials between different points are indicated. The generator G and resistance R are the approximate equivalent circuit of a telephone subset, line, and line circuit for coupling voice frequency signals to the storage condenser C, taking into consideration the transformation ratio of the line circuit transformer. They may be considered as a signal source having a net voltage $V_S$, with the condenser C as the load. In the receiving condition, condenser C may be considered as a source and resistor R as a load, $V_R$ and $V_S$ then being equal.

Some characteristics with switch 10 open may be noted. The total E.M.F. value E comprises the D.C. component $E_B$ and the A.C. component $e$. Considering short periods during which $e$ is substantially constant, the potential $V_C$ changes exponentially toward the value E at a rate determined by the time constant RC. Over long periods when the condenser is acting as a load, the potential $V_C$ will follow the E.M.F. value $e$, with attenuation and phase delay as determined by the relative values of the resistance and capacitance, which act as a low pass RC filter.

With switch 10 closed, the potential $V_C$ changes linearly at a rate determined by the ratio of the current I to the capacitance of C. This change of potential is referred to herein as the charging of the condenser.

The effect of opening and closing switch 10 in repetitive frames may be considered with reference to the graph in FIG. 13. During each frame, the switch 10 is closed at a time $T_0$, opened at time $T_X$, and closed again at time $T_3$. Thus, each frame comprises intervals $T_{0X}$ and $T_{X3}$ during which switch 10 is closed and open respectively. The total frame time is assumed to be so short that the value of $e$ is substantially constant. This value added to the bias value $E_B$ gives the total E.M.F. value $E$. At the time position $T_0$ the condenser voltage has an initial value $V_{C0}$. The current I flowing for the interval $T_{0X}$ changes the potential on the condenser by a value $V_{0X}$, which added to the initial value gives a value of $V_{CX}$. The condenser then discharges through resistance $R$ toward the value $E$, and at time $T_3$ has reached a value $V_{C3}$. Values are also shown for the potentials $V_R$ and $V_S$ at the three time positions. Note that values $V_C$, $V_R$, and $V_S$ are voltages measured at the free end of the condenser to different points, and all are represented by the curve. As the condenser potential discharges toward the value $E$, the resistance voltage drop $V_R$ decays toward zero, and the signal voltage $V_S$ changes toward the generated value $e$, in accordance with transient theory for a resistance-capacitance circuit. The change from $V_{RX}$ to $V_{R3}$ as compared to the value $V_{RX}$ may be expressed by a recovery constant $k$ defined in Equation 1. The value of $k$ is easily computed from transient equations, being a function of the ratio $T_{X3}/RC$. As this ratio approaches zero or infinity, $k$ respectively approaches zero or one.

If the values of E and of the time intervals $T_{0X}$ and $T_{X3}$ remain constant for several frames, the voltages will reach a steady state condition from frame to frame so that the net voltage change ($V_{0X}+V_{X3}$) during a frame will become zero, and the values $V_{C0}$, $V_{S0}$, and $V_{R0}$ will become equal respectively to the values $V_{C3}$, $V_{S3}$, and $V_{R3}$. Then using Equation 1, substituting the quantity ($V_{RX}-V_{0X}$) for $V_{R3}$, Equation 2 is obtained.

The other steady state voltages may be easily computed using Equation 2, the relations indicated in FIG. 13 and the fact that the values at the time positions $T_0$ and $T_3$ are equal. Note that the steady state values of $V_R$ depend only on the constant $k$ and $V_{0X}$, the latter being proportional to the time interval $T_{0X}$.

Referring to FIG. 11, two circuits as shown in FIG. 10 may be connected by a common conductor TL to form a transmission system. Instead of switch 10, electronic gates are used comprising a pair of diodes 1115, 1117 at the West terminal having a constant current source 1118 connected to their junction, and a similar but oppositely poled diode pair 1135, 1137 and current source 1138 at the East terminal. The current sources conduct during the time a pulse is applied at terminal P.

The voltages obtained with this circuit arrangement are shown in FIG. 14. The West and East terminals are shown as biased to negative values of $E_{BW}$ and $E_{BE}$ respectively. Generator GW is at an E.M.F. of $e_w$, giving a net E.M.F. value $E_W$ at the West terminal. Assuming transmission from West to East, the E.M.F. of generator GE is zero, and therefore $E_E$ equals $E_{BE}$. One complete frame and the beginning of another are shown. The pulse at P is on from $T_0$ to $T_2$ and off from $T_2$ and $T_3$. The midpoint of the pulse is indicated at $T_1$.

Initial values $V_{CW0}$ and $V_{CE0}$ are assumed for the condenser voltages, which together with the bias and signal E.M.F.'s determine the values $V_{SW0}$, $V_{RW0}$, and $V_{RE0}$. The voltages on the condensers CW and CE are shown by solid and dashed lines respectively. The current of the constant current sources flows through diodes 1115 and 1135 respectively, causing the condensers to charge in opposite directions until an equilibrium lever is reached. This equilibrium determines the time position $T_X$. For the remaining integral $T_{X2}$ of the pulse the current is diverted to flow from the constant current source 1118 through diode 1117 over the highway TL and diode 1137 to the other constant current source 1138. A small amount of the current will flow through the diodes 1115 and 1135 to maintain the condensers at the same level. During the interval $T_{23}$ between pulses each condenser discharges through its associated resistance toward its E.M.F. level. At equilibrium the value $V_{CEX}$ will equal $V_{CWX}$, but the values $V_{REX}$ and $V_{RWX}$ are not necessarily equal. Note that in the next frame the equilibrium level has shifted upward slightly. If the E.M.F.'s remain constant successive frames will shift until a steady state level is reached. Then the values $V_{RW0'}$ $V_{RW3'}$ $V_{RE0'}$ and $V_{RE3}$ will all be equal in absolute value. At all points of the frame including the equilibrium point the values $V_{RE}$ and $V_{RW}$ will be equal in absolute value and opposite in polarity.

Two important values for expressing the input and output voltages are shown graphically in FIGS. 15 and 16. These graphs show condenser voltages during the pulse interval $T_{02}$ relative to the E.M.F. value FIG. 15 shows the voltage change on the condenser CW when it is charged for the full pulse interval. The E.M.F. value $E_W$ is the algebraic sum of the bias voltage $E_{BW}$ and the instantaneous value $e$ of the generator GW. The voltages $V_{0X}$ and $V_{RX}$ (FIG. 13 at steady state) then have their maximum values, respectively designated $V_p$ and $V_k$. These maximum values may be inserted in Equation 2 to give Equation 3. As will be shown hereinafter, the input and output voltages are functions of these maximum voltages and the relative time position $T_X$ at which equilibrium occurs. The values are used in the equations as being positive numbers for both condensers, and therefore indicate only the absolute value.

FIG. 16 shows the significance of these values at no modulation, with a zero value highway control voltage. The condenser and bias voltages are shown for both terminals. Since the change on each condenser is half of $V_p$, the absolute value of the equilibrium level with respect to its bias ($V_{RX}$) is equal to half of $V_k$. Then the initial separation of the condenser voltages is $V_p$, and the net bias voltage is $V_k$.

Figure 18:
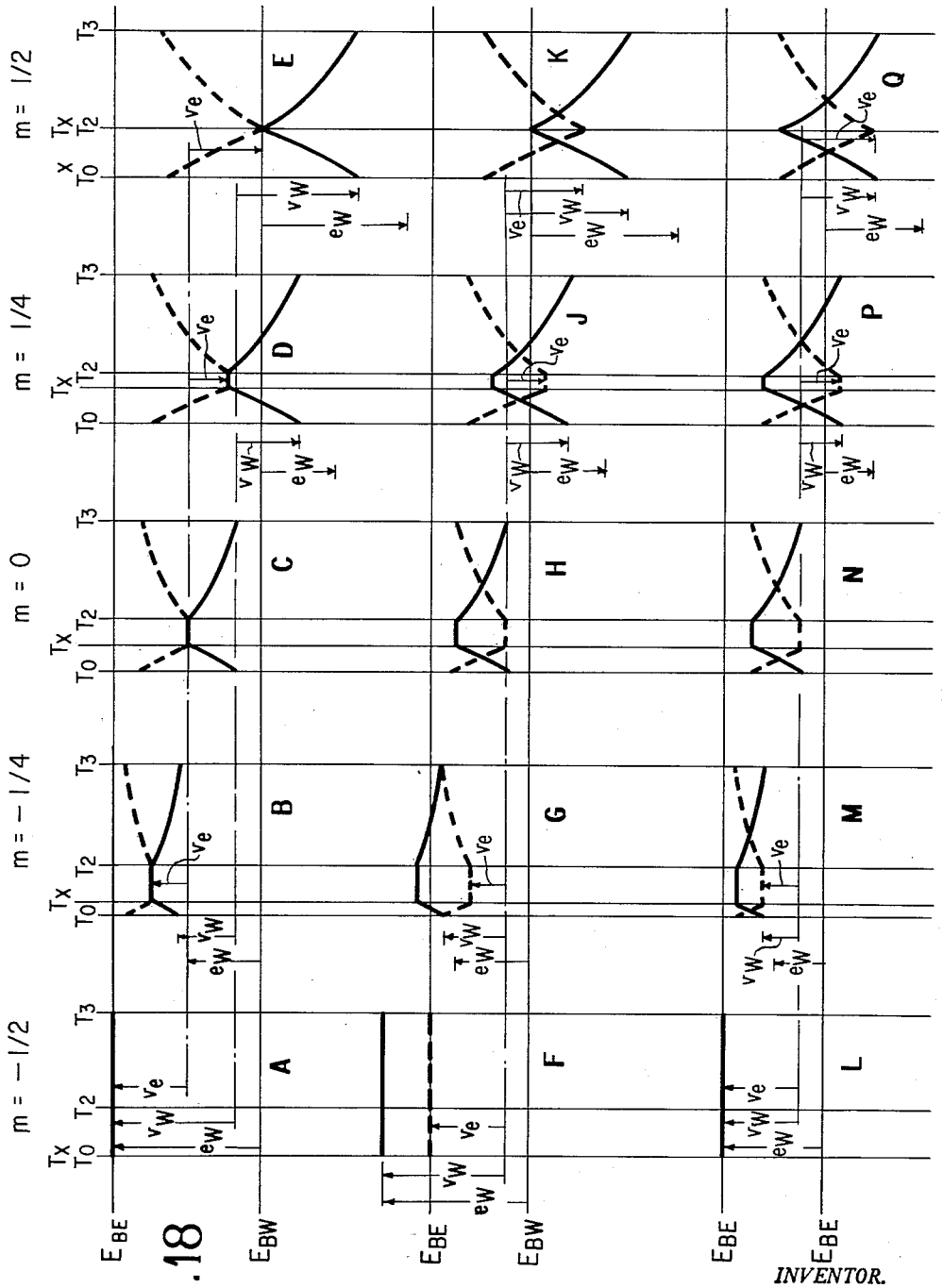
Figure 19:
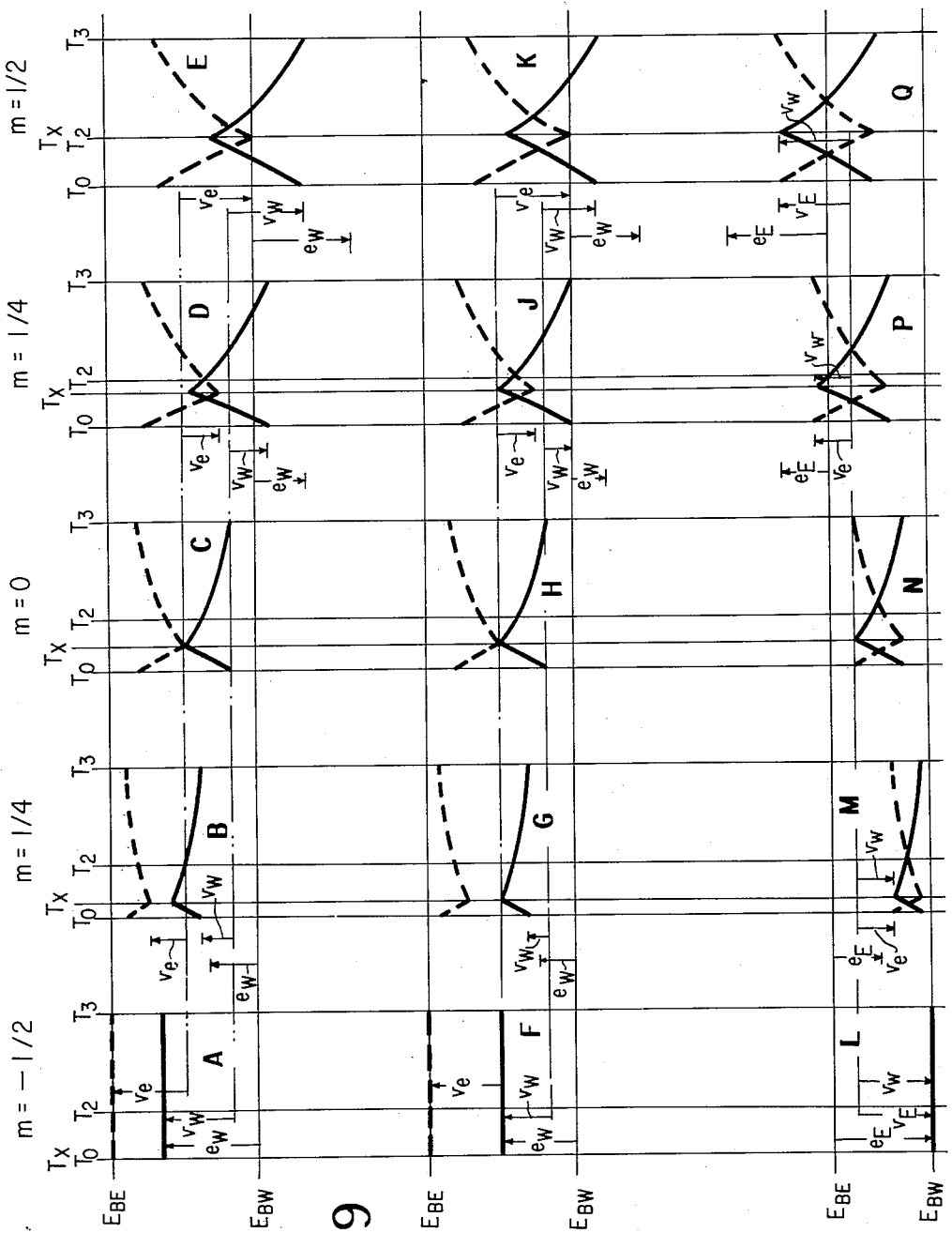

In FIGS. 18 and 19 there are several graphs to illustrate how modulation is obtained, and to show the effect of the highway control voltage. In these graphs the interval $T_{23}$ has been shortened considerably for convenience of illustration. In FIG. 18 it is assumed that the highway current flows during the interval $T_{X2}$ while in FIG. 19 it is assumed that the trigger circuit and flip-flop are used to terminate this current flow. Some of the graphs in FIG. 19 show a considerable discharge of the condenser by the time $T_2$, but in actual practice with a long frame time such as 80 microseconds compared to a slot time $T_{02}$ of 2 microseconds, the discharge at this point would be insignificant.

The graphs show clearly how the time position $T_X$ at which equilibrium occurs varies with modulation. An index of the modulation may be designated M. This index is a function of a ratio of time intervals, which is proportional to a voltage ratio as defined by Equation 4. With no modulation, the equilibrium time position TX occurs in the middle of the pulse interval so M is then ½. For convenience in writing the equations, a signal component $m$ is defined by Equation 5. In FIGS. 18 and 19 each of the graphs in a column has the same value of $m$, which from left to right are $-½$, $-¼$, $0$, $¼$, and $½$.

Each of the graphs in FIGS. 18 and 19 shows a single frame in a steady state condition. The percentage of recovery during the interval between pulses is shown the same in all the graphs of these two figures, with the value of $k$ equal to 67%.

In FIG. 18 graphs A to E apply to West to East transmission with no highway control voltage. With no modulation, shown by graph C, the condition is the same as in FIG. 16. The circuit constants are adjusted so that the equilibrium time position $T_X$ occurs in the middle of the pulse interval $T_{02}$. Then, at the initial time $T_0$, the voltages are separated by the value $V_p$ which is equal to $k$ times the net bias voltage, as shown in FIG. 16.

As $e_W$ is varied with respect to the bias value $E_{BW}$, the value of the signal component of $v_W$ of the voltage on the West condenser at the beginning of each frame $V_{CW0}$ varies with respect to its zero modulation value as shown in the graphs A to E. In response, the equilibrium time $T_X$ varies to change the value of $m$. Therefore, the signal component $v_e$ of the equilibrium voltage $V_{CEX}$ on the East condenser varies with respect to its no modulation value as shown. These graphs 18A to 18E may be applied to the system as disclosed in my copending U.S. application Serial No. 530,085, now U.S. Patent 2,931,863.

At no modulation, the condenser voltages at the beginning and equilibrium time positions of a frame are given by Equations 6 to 9. FIGS. 13 to 16 may be referred to for the various terms used in these equations. If a voltage source $E_H$ is inserted in the highway as shown in FIG. 12, and this voltage has a constant value, the graphs will be modified as shown in FIG. 18, graphs F to K, which apply to West to East transmission. In this case the equilibrium time position $T_X$ at which current commences to flow over the highway will not occur when the condenser voltages are equal to each other. Instead, it will be determined by the condition in which the loop voltage measured from ground, through one condenser, over the highway through the voltage source $E_H$ and through the other condenser back to ground is equal to zero, as expressed by Equation 10. Note that this equation applies with or without modulation. However, it is still desired that with no modulation equilibrium be reached in the middle of the pulse interval. Therefore, the voltage change on each condenser during the time interval $T_{OX}$ at no modulation will still be ½ of $V_p$, and at the steady state the voltage on each condenser with respect to its own bias voltage will still be ½ of $V_k$. Therefore, the Equations 6 to 9 still apply. However, to have the required separation at equilibrium the initial values of the condenser voltages with respect to each other must be reduced as shown in graph 18H. This is expressed in the equations by combining Equations 8, 9, and 10 and simplifying to obtain Equation 11. This shows that the bias voltage required has been reduced by the amount of the inserted highway voltage. Referring to graphs F to K of FIG. 18, it will be noted that the equilibrium values of the condenser voltages are separated by the same amount $E_H$ regardless of the modulation index $m$. It will also be noted by comparison with the corresponding ones of graphs A to E that the signal components of the voltages are not changed. If a limited bias supply voltage is available, it may be more effectively used by this arrangement of inserting a fixed voltage source in the highway. While a simple battery could be used, a more preferable arrangement is to insert a device such as a Zener diode in series in the conductor used as the common highway. This is a principal feature of my application Serial No. 707,298.

With a constant control voltage $E_H$ inserted in the highway, the signal amplitude relative to the bias voltage is increased, but the output signal amplitude relative to the input is not affected. That is, there is no benefit with respect to the gain in the transmission system. In accordance with one of the features of the invention, by inserting a varying control voltage $E_H$ in the highway (FIG. 12), the gain may be increased to make the transmission system lossless or to even have a net gain, depending on the rate of change of the control signal. Such a sawtooth control signal is shown by graph L of FIG. 9. In FIG. 17 the graph of one pulse interval shows the values which are used in the equations. The total change during the pulse interval has a value of $E_h$, and the value with respect to ground at the mid pulse time position $T_1$ is designated $E_{H1}$. These graphs (9L and FIG. 17) apply particularly to the arrangements disclosed in FIGS. 5 and 7. For the arrangements of FIGS. 3 and 4, the graph of FIG. 17 would apply to the portion before the equilibrium time position $T_X$, but during the interval $T_{X2}$ voltage would become constant.

The graphs L to Q of FIG. 18 and all of the graphs of FIG. 19 apply to arrangements with varying highway control voltages, with different values of $E_h$ and $E_{H1}$. Graphs L to Q of FIG. 18 show the case in which $E_h$ is made equal to $V_p$, and the control voltage starts from zero at the time $T_0$ so that $E_{H1}$ is equal to ½ of $V_p$. Since the condenser voltages are shown as constant during the interval $T_{X2}$, these graphs would apply particularly to the arrangements of FIGS. 3 and 4. Note that the "no modulation" graph N is the same as graph H. This is because the bias conditions are determined by the value of the control voltage at the mid pulse time position $T_1$, at which time the control voltage has a value $E_{H1}$. Therefore, the advantage of reducing the net bias voltage $E_{BN}$ relative to the other constants such as $V_p$ and $V_k$ is obtained, as shown by Equation 11.

With these particular values for the control voltage, with $E_h$ equal to $V_p$ and starting from zero at the beginning of the pulse interval, the equilibrium voltage on each condenser will be equal to the initial voltage at time $T_0$ on the other condenser, regardless of the modulation level, as shown in the graphs L to Q. These graphs show West to East transmission. Note that the value of the signal component $v_W$ at the beginning of the pulse on the input condenser is equal to the signal component $v_e$ of the equilibrium voltage on the output condenser. These graphs also bring out the fact that the equilibrium values of the condenser voltages are separated by an amount which depends upon the time position $T_X$ at which equilibrium occurs.

In all of the graphs of FIG. 19 it is assumed that the flip-flop as shown in FIGS. 5 and 7 is used, so that the condensers start to discharge shortly after the equilibrium time $T_X$.

In graphs A to K of FIG. 19 the mid pulse value $E_{H1}$ of the control voltage is zero. Therefore, the graphs C and H for no modulation are the same during the time interval $T_{OX}$ as in graph 18C and in FIG. 16. In graphs A to E of FIG. 19 the value of $E_h$ is equal to $V_p$, and in the graphs F to K the value $E_h$ is equal to $V_k$. Note that in graphs 19A to 19E the signal components are the same as in the corresponding graphs 18L to 18Q. Graphs 19F to 19K show that the output voltage $v_e$ is equal in amplitude to the generated value $e_W$ of the input signal, and that with respect to the value $v_W$ at the input condenser at the beginning of the pulse interval gain is obtained. These graphs A to K of FIG. 19 are for West to East transmission.

Graphs L to Q of FIG. 19 are similar to graphs L to Q of FIG. 18 except that they are for East to West transmission, and the trigger circuit and flip-flop have been added. These graphs would apply to the arrangement of FIG. 5 showing the combination of a control voltage having a constant and a varying component, in combination with a trigger circuit and flip-flop arrangement. These graphs L to Q of FIG. 19 may be compared to the corresponding graphs of FIG. 18 to show the effect of the direction of transmission.

The graphs for East to West transmission for the other graphs A to K of each of FIGS. 18 and 19 may be easily derived. The "no modulation" frames C and H will, of course, be the same. The corresponding signal components for any value of $m$ will be the same in amplitude but opposite in polarity. The generated signal $e_E$ will be measured from the bias level $E_{BE}$, and the input signal $v_E$ and output signal $v_W$ will be measured from their "no modulation" values.

The values of the signal components of the condenser voltages are given by equations 12 to 16 for West to East transmission and by Equations 17 to 21 for East to West transmission. Note that each of these voltages is proportional to $m$, with a constant including one or more of the quantities $V_k$, $V_p$, and $E_h$.

Expressions for the gain are given by Equations 22 and 23. In each of these equations the output voltage is taken as being the signal component of the equilibrium voltage on the receiving condenser. In Equation 22 the input voltage is taken as the value at the transmitting condenser at the beginning of a pulse interval. In Equation 23 the input signal is taken as being the generated E.M.F. These equations show that to obtain lossless transmission, if Equation 22 is used $E_h$ should be equal to the $V_p$, and if Equation 23 is used, $V_h$ should be equal to $V_k$. If larger values of $E_h$ are used, gain is obtained, with a limiting condition that the denominator of both equations should remain greater than zero.

The effect of changing the value of $k$ is brought out by the Equations 12 to 23. Referring particularly to West to East transmission, if $k$ approaches unity, then the value of $V_p$ approaches the value of $V_k$, and consequently the value of $v_W$ approaches the value of $e_W$, and the value of $V_{CE0}$ approaches zero. Also, the gain, as expressed by Equation 22 approaches the value as expressed by Equation 23.

If $k$ approaches zero, the value of $v_W$ becomes small compared to $e_W$. The value of $v_{CE0}$ approaches the value of $v_e$, indicating that the average value of the output voltage approaches its peak value. The gain, as expressed by Equation 23 becomes considerably less than the value expressed by Equation 22. Also, when $k$ approaches zero, since $V_p$ is small compared to $V_k$, several pulse cycles will be required for the voltages to change between their minimum and maximum values. On the other hand, if $k$ approaches unity, the change between extreme values will be substantially complete within a single frame.

If $E_h$ is equal to zero, then Equations 12 to 23 apply to the condition in which the highway control voltage is zero or has a constant value, as illustrated by the graphs A to K of FIG. 18. The gain, as given by Equation 23, is equal to ½, indicating a 6DB loss. If Equation 22 is used, the gain has a value between the limits of ½ and unity, depending upon the value of $k$.

With a varying (sawtooth) highway control voltage, the equations show that the output signal voltages do not depend directly on the value of the control voltage. However, the output is proportional to $m$, the value of which decreases as the value of $E_h$ is increased for a given value of signal input voltage. Thus, as shown by Equations 22 and 23, the gain increases as the value of $E_h$ is increased. This is brought out by the graphs A to K of FIG. 19. In the graphs with corresponding values of $m$ the output voltages are shown to be equal. However, in graphs F to K the value of $E_h$ is larger than in graphs A to E, and therefore the input signal voltages are smaller.

EQUATIONS

The following equations apply to the transmission system, using the parameters designated in FIGS. 10 to 17 inclusive. Equations which apply to a frame-to-frame steady state condition only are designated by an asterisk (*).

$$k = \frac{V_{RX} - V_{RS}}{V_{RX}} \quad (1)$$

$$V_{OX} = kV_{RX} \quad (2)*$$

$$V_p = kV_k \quad (3)$$

Modulation index $$M = \frac{T_{0x}}{T_{02}} = \left|\frac{V_{0x}}{V_p}\right| \quad (4)$$

$$m = M - \tfrac{1}{2} \quad (5)$$

No modulation $$V_{CE0} = E_{BE} + V_{RE0} = E_{BE} - \frac{(V_k - V_p)}{2} \quad (6)*$$

$$V_{CW0} = E_{BW} + V_{RW0} = E_{BW} + \frac{(V_k - V_p)}{2} \quad (7)*$$

$$V_{CEX} = E_{BE} + V_{REX} = E_{BE} - \frac{V_k}{2} \quad (8)*$$

$$V_{CWX} = E_{BW} + V_{RWX} = E_{BW} + \frac{V_k}{2} \quad (9)*$$

$$V_{CEX} + E_H = V_{CWX} \quad (10)$$

$$E_{BN} = E_{BE} - E_{BW} = V_k - E_{H1} \quad (11)$$

The signal components of the voltages are designated by using lower case $e$ or $v$. The subscripts of the peak input and output condenser voltages are simplified. For West to East transmission the signal component of $V_{CW0}$ is $v_W$, and of $V_{CEX}$ it is $v_e$. For East to West transmission the signal component of $V_{CE0}$ is $v_E$, and of $V_{CWX}$ it is $v_w$.

West to East transmission $$e_W = -(2V_k - E_h)m \quad (12)*$$
$$v_W = -(V_k + V_p - E_h)m \quad (13)*$$
$$v_{CWX} = -(V_k - E_h)m \quad (14)*$$
$$v_e = -V_k m \quad (15)*$$
$$v_{CE0} = -(V_k - V_p)m \quad (16)*$$

East to West transmission $$e_E = (2V_k - E_h)m \quad (17)*$$
$$v_E = (V_k + V_p - E_h)m \quad (18)*$$
$$v_{CEX} = (V_k - E_h)m \quad (19)*$$
$$v_w = V_k m \quad (20)*$$
$$v_{CW0} = (V_k - V_p)m \quad (21)*$$

Gain $$\frac{v_e}{v_W} = \frac{v_w}{v_E} = \frac{V_k}{V_k + V_p - E_h} \quad (22)$$

$$\frac{v_e}{e_W} = \frac{v_w}{e_E} = \frac{V_k}{2V_k - E_h} \quad (23)$$

What is claimed is:
1. In a time division multiplex communication system, a first group and a second group of transmission paths, each path having impedance means connected thereto, a transmission medium between and common to said first-group and second-group paths, transmission gates interposed between both said first-group and second-group paths and said common medium, means for applying trains of enabling pulses coincidently to a predetermined pair of said first-group and second-group gates, means for interposing in said medium a varying control voltage during each pulse interval, said first-group and second-group gates as well as the pulses of said two pulse trains being of opposite polarity so that the potentials across the impedance means of the corresponding pair of first-group and second-group transmission paths are caused to change in opposite sense and current is permitted to flow over said common medium only after the potentials at said two gates have incident to said change reached an equilibrium point at which the loop sum of the potentials across the two impedance means and the control voltage is zero, and signal coupling means connected to said first-group paths, the time position in the pulse interval at which said equilibrium point is reached being shifted in accordance with a signal voltage impressed on said predetermined first-group path by way of the corresponding coupling means, whereby the signal voltage on said predetermined second-group path is made to follow the signal voltage impressed on said predetermined first-group path.

2. In a communication system according to claim 1, means responsive to current flow over said medium for terminating said enabling pulses at both of said junctures for the remainder of the pulse interval.

3. In a communication system according to claim 1, wherein said transmission medium comprises a conductor, and said means for interposing a varying control voltage comprises a transformer having one winding connected in series in said conductor, a source of varying voltage and means coupling it to another winding of said transformer.

4. In a communication system according to claim 1, wherein said transmission medium comprises a conductor, and said means for interposing a varying control voltage comprises a condenser connected in series in said conductor and a source of current for charging said condenser during each pulse interval.

5. In a communication system according to claim 1, wherein said control voltage varies linearly during each pulse interval.

6. In a time division multiplex telephone system, a first group and a second group of transmission paths, each path having a capacitor connected thereto, a two-way transmission medium between and common to said first-group and second-group paths, transmission gates interposed between both said first-group and second-group paths and said common medium, means for applying trains of enabling pulses coincidently to a predetermined pair of said first-group and second-group gates, means for interposing in said medium a varying control voltage during each pulse interval, the pulses of said two pulse trains being of opposite polarity and said gates including rectifier means poled so that the capacitors connected to the corresponding two paths are charged in opposite directions by the two oppositely directed pulse currents, and that after the potentials across said capacitors have reached an equilibrium point at which the loop sum of the two capacitor potentials and the control voltage is substantially zero, the pulse current is deflected at each of said two gates from the corresponding capacitor over said common medium, and signal coupling means connected to each said first-group and second-group transmission path, the time position in the pulse interval at which said equilibrium point is reached being shifted in accordance with a signal voltage impressed on the first-group or second-group path of said predetermined pair by way of the corresponding coupling means, whereby the signal voltages on the first-group and second-group paths of said predetermined pair are made to follow each other.

7. In a telephone system according to claim 6, means responsive to the current flow over said transmission medium after said equilibrium point is reached for preventing further change of potential between said two predetermined gates at the respective ends of said transmission medium for the remainder of the pulse interval.

8. In a telephone system according to claim 7, wherein said means for interposing a control voltage includes a generator which produces linearly varying output voltage during the portion of each pulse interval preceding said equilibrium point, and said means for preventing further change of voltage comprises means for causing the output of said generator to be substantially constant during said remaining portion of the pulse interval.

9. In a telephone system according to claim 7, wherein said transmission medium comprises a conductor, a first and a second transformer each having one winding connected in series in said conductor, said means for interposing a control voltage comprises a varying voltage generator and means coupling it to another winding of said first transformer, said means for applying trains of enabling pulses comprises a first source of current of one direction connected to the first group gate and a second source of current of the opposite direction connected to the second group gate of said predetermined pair, an individual "and" gate associated with each of said sources of current, each "and" gate having two input leads and having an output lead coupled to its associated source, a flip-flop which normally applies an "on" signal to a conductor extending from its output in multiple to one input lead of each "and" gate, means for applying trains of control pulses coincidentally to the other input leads of the two "and" gates associated with said predetermined pair of transmission gates, said control pulses having time intervals of a given width, the coincidence of a control pulse and said "on" signal at each of said pair of "and" gates producing a signal on the "and" gate output to control its associated current source to produce said enabling pulses at each of said predetermined pair of gates, and said means for preventing further voltage change after equilibrium is reached comprises a trigger circuit coupled to another winding of said second transformer for detecting current flow over said conductor to operate said flip-flop and terminate said "on" signal at its output, to thereby block the output of each "and" gate to terminate said enabling pulses.

10. In a telephone system according to claim 9, wherein said pulses occur in repetitive frames, each frame comprising a series of time slots with one slot per channel, each said time slot comprising a control pulse interval and a guard interval, a clamp circuit connected between said conductor and ground for clamping the conductor to a given potential with respect to ground during each guard interval, a source of reset pulses occurring during all of the said guard intervals of each frame, said source of reset pulses being coupled to said control voltage generator to synchronize it, to an input of said flip-flop to reset its output to the "on" condition during each guard interval, and to said clamp circuit to actuate it during each guard interval.

11. In a telephone system according to claim 6, wherein with no modulation said equilibrium time position is reached in the middle of said pulse interval, means for causing said control voltage to have a value at the equilibrium time such that the potential difference between said two ends of the conductor assumes a polarity opposite to the polarity of the potential difference existing at the beginning of the pulse interval.

12. In a telephone system according to claim 11, wherein said means for interposing a control voltage comprises a transformer having one winding connected in series in said transmission conductor, said winding being divided into two portions, a source of varying voltage and means coupling it to another winding of said transformer, a condenser connected in series between said two winding portions, and a diode connected in shunt across one portion of the winding and said condenser, the diode being reversely poled with respect to said control voltage.

13. In a telephone system according to claim 6, wherein said transmission medium comprises a conductor, and said means for interposing a varying control voltage comprises a condenser connected in series in said conductor, a source of current for charging said condenser during the portion of said pulse interval before said equilibrium time position, a source of bias current substantially equal in value to the pulse current flowing between said gates over said conductor after said equilibrium time position for maintaining the charge on said capacitor substantially constant during this portion of the pulse interval, and means for discharging said condenser after the end of each pulse interval.

14. In a telephone system according to claim 6, wherein each said first group and second group transmission path includes a series inductor to aid in blocking the pulse frequency signals while passing voice frequency signals.

15. In a signaling system, a transmission medium having a first and a second end, signal transmitting means connected to the first end of said medium, signal receiving means connected to the second end of said medium, a first source of current of one direction connected to the juncture of said transmitting means with said first end, a second source of current of the opposite direction connected to the juncture of said receiving means with said second end, an "and" gate associated with each of said sources, each gate having two input leads and having an output lead coupled to its associated source, a device which normally applies an "on" signal to one input lead of each gate, means for applying trains of control pulses coincidently to the other input leads of the two gates associated with said first and second sources, said control pulses having time intervals of a given width, the sources being actuated to produce current flow to said junctures responsive to the gate pulses passed during coincidence of the "on" signal and pulse at the respective input leads, said signal transmitting means determining the time position during said time interval at which current commences to flow from one of said junctures to the other over said transmission medium, the voltage across said signal receiving means being determined by said time position, and means responsive to current flow over said transmission medium for terminating said "on" signal at said input leads for the remainder of the time interval, thereby terminating the gate pulses and the flow of current from said sources for the pulse interval, whereby the current flows over said medium for only a small portion of each time interval regardless of when said time position occurs within said interval.

16. In a signaling system according to claim 15, means for interposing in said common transmission medium a varying control voltage during each pulse interval, said control voltage acting in conjunction with said signal transmitting means to determine the said time position during each said time interval at which current commences to flow over said transmission medium.

17. In a signaling system according to claim 15, wherein said device comprises a flip-flop which has an output connected in multiple to said one input lead of each gate for supplying said normally "on" signal, and said means responsive to current flow over said transmission medium comprises a trigger circuit which responsive to said current flow applies a pulse to an input of said flip-flop to terminate said "on" signal for said remainder of the pulse interval.

18. In a time division multiplex telephone system, a first group and a second group of transmission paths, each path having a capacitor connected thereto, a two-way transmission medium between and common to said first-group and second-group paths, transmission gates interposed between both said first-group and second-group paths and said common medium, means for applying trains of enabling pulses coincidently to a predetermined pair of said first-group and second-group gates, the pulses of said two pulse trains being of opposite polarity and being within a given time interval and said gates including rectifier means poled so that the capacitors connected to the corresponding two paths are charged in opposite directions by the two oppositely directed pulse currents, and that, after the potentials across said capacitors have reached an equilibrium point, the pulse current is deflected at each of said two gates from the corresponding capacitor over said common medium, and signal coupling means connected to each said first-group and second-group transmission path, the time position in the pulse interval at which said equilibrium point is reached being shifted in accordance with a signal voltage impressed on the first-group or second-group path of said predetermined pair by way of the corresponding coupling means, whereby the signal voltages on the first-group and second-group paths of said predetermined pair are made to follow each other, and means responsive to the current flow over said common medium for terminating the pulse current for the duration of the pulse interval at each of said two gates.

19. In telephone system according to claim 18, wherein said transmission medium comprises a conductor; a first and a second transformer each having one winding connected in series in said conductor; said means for interposing a control voltage comprises a varying voltage generator and means coupling it to another winding of said first transformer; said means for applying trains of enabling pulses comprises a first source of current of one direction connected to the first group gate and a second source of current of the opposite direction connected to the second group gate of said predetermined pair, an individual "and" gate associated with each of said sources of current, each "and" gate having two input leads and having an output lead coupled to its associated source, a flip-flop which normally applies on "on" signal to a conductor extending from its output in multiple to one input lead of each "and" gate, means for applying trains of control pulses coincidentally to the other input leads of the two "and" gates associated with said predetermined pair of transmission gates, said control pulses having time intervals of a given width, the coincidence of a control pulse and said "on" signal at each of said pair of "and" gates producing a signal on the "and" gate output to control its associated current source to produce said enabling pulses at each of said predetermined pair of gates; said means responsive to current flow over said common medium includes a trigger circuit coupled to another winding of said second transformer, the output of the trigger circuit being coupled to an input of said flip-flop to operate it and terminate said "on" signal at its output, to thereby block the output of each "and" gate to terminate said enabling pulses.

20. In a telephone system according to claim 19, wherein said pulses occur in repetitive frames, each frame comprising a series of time slots with one slot per channel, each said time slot comprising a control pulse interval and a guard interval; a clamp circuit connected between said conductor and ground for clamping the conductor to a given potential with respect to ground during each guard interval, a source of reset pulses occurring during all of the said guard intervals of each frame, said source of reset pulses being coupled to said control voltage generator to synchronize it, to an input of said flip-flop to reset its output to the "on" condition during each guard interval, and to said clamp circuit to actuate it during each guard interval.

References Cited in the file of this patent

UNITED STATES PATENTS

| | | |
|---|---|---|
| 2,607,035 | Levine | Aug. 12, 1952 |
| 2,691,073 | Lowman | Oct. 5, 1954 |
| 2,827,516 | Morris | Mar. 18, 1958 |
| 2,830,125 | Elliott | Apr. 8, 1958 |
| 2,836,658 | Weintraub | May 27, 1958 |
| 2,851,617 | Walker | Sept. 9, 1958 |